(12) United States Patent
McEntire et al.

(10) Patent No.: US 12,520,890 B2
(45) Date of Patent: Jan. 13, 2026

(54) ANTIPATHOGENIC FIBROUS MATERIAL

(71) Applicant: SINTX Technologies, Inc., Salt Lake City, UT (US)

(72) Inventors: Bryan J. McEntire, Salt Lake City, UT (US); Ryan M. Bock, Salt Lake City, UT (US); Bhajanjit Singh Bal, Salt Lake City, UT (US)

(73) Assignee: SINTX Technologies, Inc., Salt Lake City, UT (US)

( * ) Notice: Subject to any disclaimer, the term of this patent is extended or adjusted under 35 U.S.C. 154(b) by 0 days.

(21) Appl. No.: 18/512,553

(22) Filed: Nov. 17, 2023

(65) Prior Publication Data

US 2024/0081442 A1 Mar. 14, 2024

Related U.S. Application Data

(63) Continuation of application No. 17/230,284, filed on Apr. 14, 2021, now Pat. No. 11,857,001, which is a continuation-in-part of application No. 16/550,605, filed on Aug. 26, 2019, now Pat. No. 11,192,787.

(60) Provisional application No. 63/009,842, filed on Apr. 14, 2020, provisional application No. 62/800,034, filed on Feb. 1, 2019, provisional application No. 62/727,724, filed on Sep. 6, 2018.

(51) Int. Cl.
*D06B 13/00* (2006.01)
*A41D 13/11* (2006.01)
*D06M 11/77* (2006.01)
*D06M 101/20* (2006.01)

(52) U.S. Cl.
CPC .......... *A41D 13/1192* (2013.01); *D06B 13/00* (2013.01); *D06M 11/77* (2013.01); *A41D 2500/30* (2013.01); *D06M 2101/20* (2013.01); *D10B 2501/04* (2013.01)

(58) Field of Classification Search
None
See application file for complete search history.

(56) References Cited

U.S. PATENT DOCUMENTS

| | | | |
|---|---|---|---|
| 6,302,913 B1 | 10/2001 | Ripamonti et al. |
| 7,776,085 B2 | 8/2010 | Bemero et al. |
| 9,925,295 B2 | 3/2018 | McEntire et al. |
| 10,806,831 B2 | 10/2020 | McEntire et al. |
| 11,192,787 B2 | 12/2021 | McEntire et al. |
| 11,591,217 B2 | 2/2023 | McEntire et al. |
| 12,017,912 B2 | 6/2024 | McEntire et al. |
| 2004/0000313 A1 | 1/2004 | Gaynor et al. |
| 2005/0079379 A1 | 4/2005 | Wadsworth et al. |
| 2005/0182152 A1 | 8/2005 | Nonninger et al. |
| 2009/0041818 A1 | 2/2009 | Otsuki et al. |
| 2009/0320172 A1 | 12/2009 | Slate et al. |
| 2010/0040655 A1 | 2/2010 | Ren et al. |
| 2010/0136325 A1 | 6/2010 | Reddy et al. |
| 2012/0060258 A1 | 3/2012 | Stewart et al. |
| 2013/0236854 A1 | 9/2013 | McEntire et al. |
| 2013/0302509 A1 | 11/2013 | McEntire |
| 2016/0339144 A1 | 11/2016 | McEntire |
| 2017/0109701 A1 | 4/2017 | Khasnis et al. |
| 2017/0197014 A1 | 7/2017 | McEntire et al. |
| 2020/0079651 A1 | 3/2020 | McEntire et al. |
| 2022/0315941 A1 | 10/2022 | Flavell et al. |

FOREIGN PATENT DOCUMENTS

| | | |
|---|---|---|
| CN | 102805081 A | 12/2012 |
| CN | 105085016 A | 11/2015 |
| CN | 106386908 A | 2/2017 |
| CN | 107926975 A | 4/2018 |
| EP | 0807766 B1 | 12/2003 |
| JP | H2277849 A | 11/1990 |
| JP | 2001003276 A | 1/2001 |
| JP | 2009526828 A | 7/2009 |
| JP | 2012528255 A | 11/2012 |
| JP | 2015516239 A | 6/2015 |
| JP | 2018002646 A | 1/2018 |
| JP | 2020019677 A | 2/2020 |
| JP | 2020512072 A | 4/2020 |
| KR | 1020090003230 A | 1/2009 |
| KR | 1020150005986 A | 1/2015 |
| WO | 2011067005 A1 | 6/2011 |
| WO | 2020051004 A1 | 3/2020 |
| WO | 2021211697 A1 | 10/2021 |

OTHER PUBLICATIONS

U.S. Patent and Trademark Office, Final Office Action, U.S. Appl. No. 17/230,402, dated Apr. 14, 2023, 11 pages.
U.S. Patent and Trademark Office, Non-Final Office Action, U.S. Appl. No. 17/230,395, dated Apr. 6, 2023, 11 pages.
IP Australia, Examination Report No. 2 for Standard Patent Application, Application No. 2019336133, dated May 3, 2023, 5 pages.
China National Intellectual Property Administration (CNIPA), First Office Action, Application No. 201980058291.0, Mar. 8, 2023, 18 pages.
U.S. Patent and Trademark Office, Non-Final Office Action, U.S. Appl. No. 18/062,681, dated Jul. 17, 2023, 8 pages.
U.S. Patent and Trademark Office, Office Action in related U.S. Appl. No. 17/230,395 issued Oct. 28, 2022, 11 pages.
U.S. Patent and Trademark Office, Office Action in related U.S. Appl. No. 17/230,402 issued Oct. 28, 2022, 12 pages.
Pezzotti et al., Rapid Inactivation of SARS-CoV-2 by Silicon Nitride, Copper, and Aluminum Nitride, 2020, 16 pages.
Canada Intellectual Property Office, Office Action issued, Canadian Application No. 3, 109,874, Nov. 25, 2022 4 pages.
European Patent Office, Extended European Search Report issued in corresponding Application No. 19856613.5 on May 2, 2022, 10 pages.
European Patent Office, Extended European Search Report, Application No. 21788806.4, Jun. 17, 2024, 11 pages.

(Continued)

*Primary Examiner* — Alton N Pryor
(74) *Attorney, Agent, or Firm* — Polsinelli PC

(57) ABSTRACT

Described herein is an antiviral face mask and methods of use thereof to inactivate a virus in contact with the face mask. The face mask may include a fibrous material with silicon nitride powder impregnated therein and a layer surrounding the fibrous material. In some embodiments, silicon nitride is present in the fibrous material at a concentration of about 1 wt. % to about 15 wt. %.

17 Claims, 32 Drawing Sheets
(26 of 32 Drawing Sheet(s) Filed in Color)

(56) References Cited

OTHER PUBLICATIONS

European Patent Office, Extended European Search Report, Application No. 21832601.5, Jun. 20, 2024, 8 pages.
China National Intellectual Property Administration, Decision on Rejection, Application No. 201900582910, Apr. 12, 2024 17 pages.
European Patent Office, Partial Supplementary European Search Report, Application No. 21788806.4, Mar. 27, 2024, 12 pages.
China National Intellectual Property Administration, Third Office Action, Application No. 201900582910, Jan. 23, 2024, 10 pages.
Japan Patent Office, Notice of Reasons for Rejection, Application No. 2023-071160, Mar. 28, 2024, 5 pages.
Japan Patent Office, Notice of Reasons for Rejection, Application No. 2023-071160, Sep. 24, 2024, 3 pages.
China National Intellectual Property Administration, Second Office Action, Application No. 201900582910, Nov. 13, 2023, 25 pages.
Korean Intellectual Property Office, Notification of Provisional Rejection, Application No. 10-2021-7009890, Jan. 12, 2024, 17 pages.
Japan Patent Office, Notice of Reasons for Rejection (Office Action), Application No. 2022-562405, May 7, 2025, 5 pages.
Korean Intellectual Property Office (KIPO), Notice of Preliminarty Rejection (Non-Final), Application No. 10-2022-7038579, May 16, 2025, 14 pages.
Lehman, C. et al., "Silicon Nitride Inactivates SARS-COV-2 in Vitro," BIORIXIV, Aug. 29, 2020, pp. 1-11.

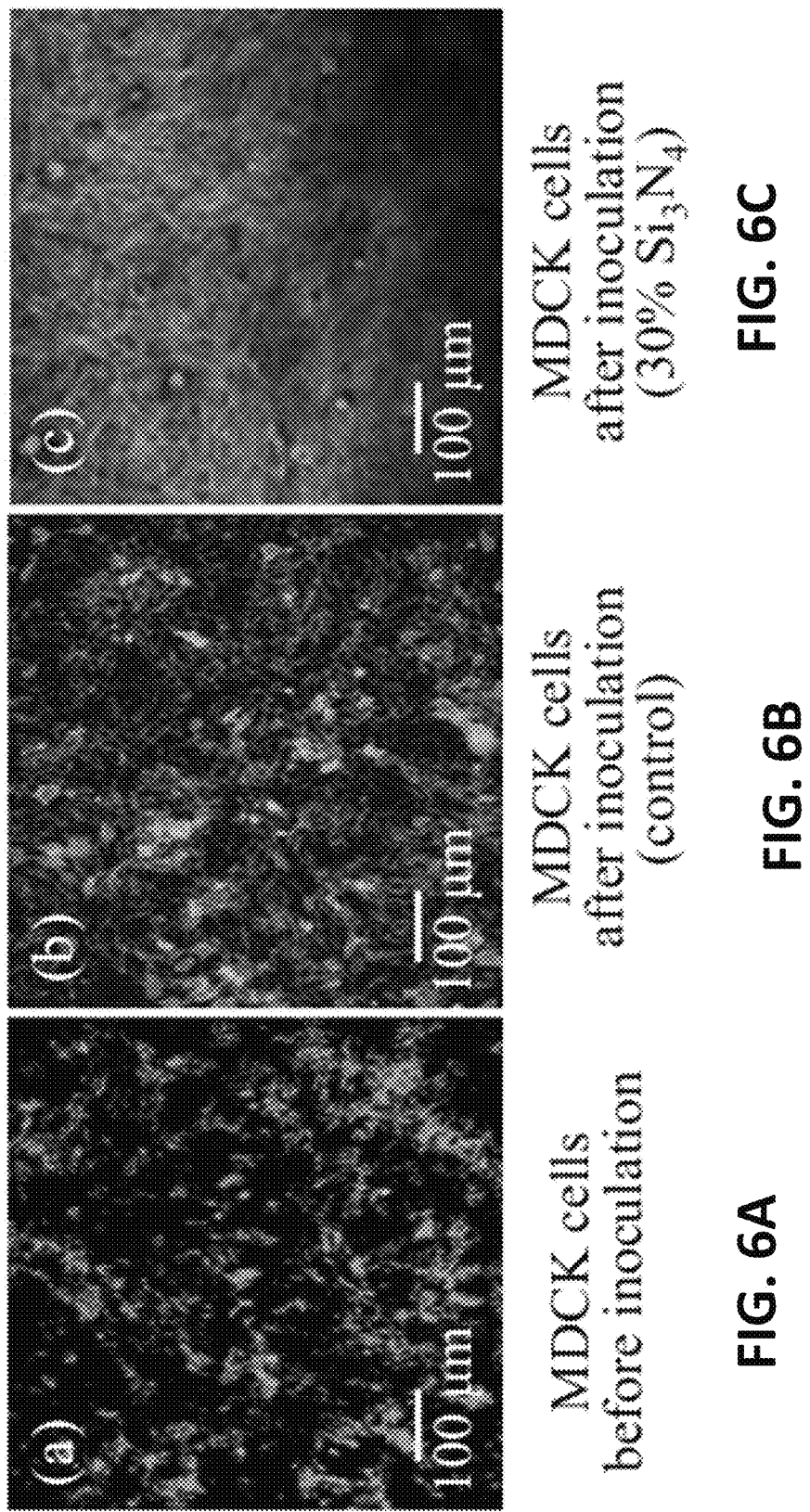

FIG. 10

NP + F-actin

Viral NP

F-actin

NP + F-actin

Viral NP

F-actin

| Mean | 0.745 µm |
|---|---|
| Median | 0.279 µm |
| D10 | 0.102 µm |
| D50 | 0.279 µm |
| D90 | 1.844 µm |

Supernatant Filter and Max. Influenza A virion

FIG. 17

| Mean | 0.745 µm |
|---|---|
| Median | 0.279 µm |
| D10 | 0.102 µm |
| D50 | 0.279 µm |
| D90 | 1.844 µm |

Supernatant Filter and Max. SARS-CoV-2 size

FIG. 22

ANTIPATHOGENIC FIBROUS MATERIAL

CROSS-REFERENCE TO RELATED APPLICATIONS

This application is a Continuation of U.S. application Ser. No. 17/230,284, filed Apr. 14, 2021, which is a Continuation-in-Part of U.S. application Ser. No. 16/550,605, filed Aug. 26, 2019 that claims the benefit of U.S. Provisional Application Nos. 62/727,724, filed Sep. 6, 2018 and 62/800,034, filed Feb. 1, 2019. This application also claims the benefit of U.S. Provisional Application No. 63/009,842, filed Apr. 14, 2020. The contents of all of which are entirely incorporated by reference herein.

FIELD

The present disclosure relates to antiviral, antibacterial, and antifungal compositions, systems, methods, and devices. More specifically, the disclosure relates to silicon nitride compositions, devices, and coatings for the inactivation and lysis of viruses, bacteria, and fungi.

BACKGROUND

The need for safe and reliable inactivation, removal, or lysis of viruses, bacteria, and fungi is universal. There is a broad need to control the pathogens that affect human health. Not only is there a need for materials that possess antipathogenic properties for human medicinal therapies, but there is also a need for antipathogenic surface coatings and/or composites for various medical devices or equipment, examination tables, clothing, filters, masks, gloves, catheters, endoscopic instruments, and the like.

Masks and respirators are typically limited to single use because pathogens captured on filters may cause cross-infection, new aerosol release, and contaminated waste due to their ability to survive for a few hours to several days on surfaces. Airborne particles are considered to be the primary transmission route for pathogens such as influenza and SARS-CoV-2. Facial coverings are critically important for source control, but the vast majority of masks produced today are simple filtration devices. Virus particles trapped in the mask can not only contaminate the wearer during daily use, but they can also be re-aerosolized during mask adjustments or removal; and soiled masks represent a significant biohazard for disposal. This is unfortunate because virus viability on surgical masks and respirators is clinically preventable. For instance, copper has been used in common hospital and household items for centuries because of its antimicrobial characteristics. It has been incorporated into surgical masks but it is toxic in concentrations above nutrient levels. Several other antiviral agents have also been proposed for use in masks or respirators. They include silver, zinc, iodine, chitosan, peptides, quaternary ammonium salts, and nanoparticles. The effectiveness of most of these compounds has yet to be clinical demonstrated, and their value remains debatable, because they can be toxins, allergens, irritants, or limited in their bacterial or viricidal efficacy, or expensive.

Therefore, there is a need for safe and reliable methods to inactivate and kill viruses, bacteria, and fungi that may be applied to masks, medical devices, equipment, clothing, or other systems which may have prolonged contact with the human body.

SUMMARY

Provided herein are embodiments of an antiviral face mask for inactivating and/or preventing the transmission of a virus. In one aspect, the face mask may include a face mask body including a fibrous material with silicon nitride powder impregnated in the fibrous material. In some embodiments, the face mask body may include an outer layer surrounding the fibrous material. In some embodiments, the silicon nitride may be present in the fibrous material at a concentration of about 1 wt. % to about 15 wt. % and the silicon nitride inactivates a virus in contact with the fibrous material of the antiviral face mask. In some aspects, the silicon nitride in the fibrous material is present at a concentration of less than about 10 wt. %.

The face mask body may be made of a fibrous material, such that when droplets or aerosols containing the virus are captured by the face mask fibers, the silicon nitride powder inactivates them. The virus may be in contact with the silicon nitride powder for at least 1 minute.

Also provided herein are embodiments for an antiviral face mask that includes a face mask body and one or more filters in the face mask body, each filter including at least one layer with silicon nitride powder impregnated in the layer. The silicon nitride may be present at a concentration of about 1 wt. % to about 15 wt. % and the silicon nitride inactivates a virus in contact with the one or more filters of the antiviral face mask. In some aspects, the silicon nitride in each filter is present at a concentration of less than about 10 wt. %.

The face mask body and/or one or more filters are made of a fibrous material, such that when droplets or aerosols containing the virus are captured by one or more filters, the silicon nitride powder inactivates them. The virus may be in contact with the silicon nitride powder for at least 1 minute.

Also described herein is a method of preventing transmission of a virus. The method may include contacting an antiviral face mask with the virus, where a silicon nitride powder is impregnated in a fibrous material of the face mask at a concentration of about 1 wt. % to about 15 wt. %. In some aspects, the silicon nitride in the fibrous material is present at a concentration of less than about 10 wt. %. The silicon nitride inactivates the virus.

In some aspects, the face mask and/or filter is made of a fibrous material, such that droplets or aerosols containing the virus are captured by the mask or filter fibers and the silicon nitride powder inactivates them. The virus may be in contact with the silicon nitride powder for at least 1 minute.

Other aspects and iterations of the invention are described more thoroughly below.

BRIEF DESCRIPTION OF THE DRAWINGS

The present patent or application file contains at least one drawing executed in color. Copies of this patent or patent application publication with color drawing(s) will be provided by the Office upon request and payment of the necessary fee.

Figure 1:
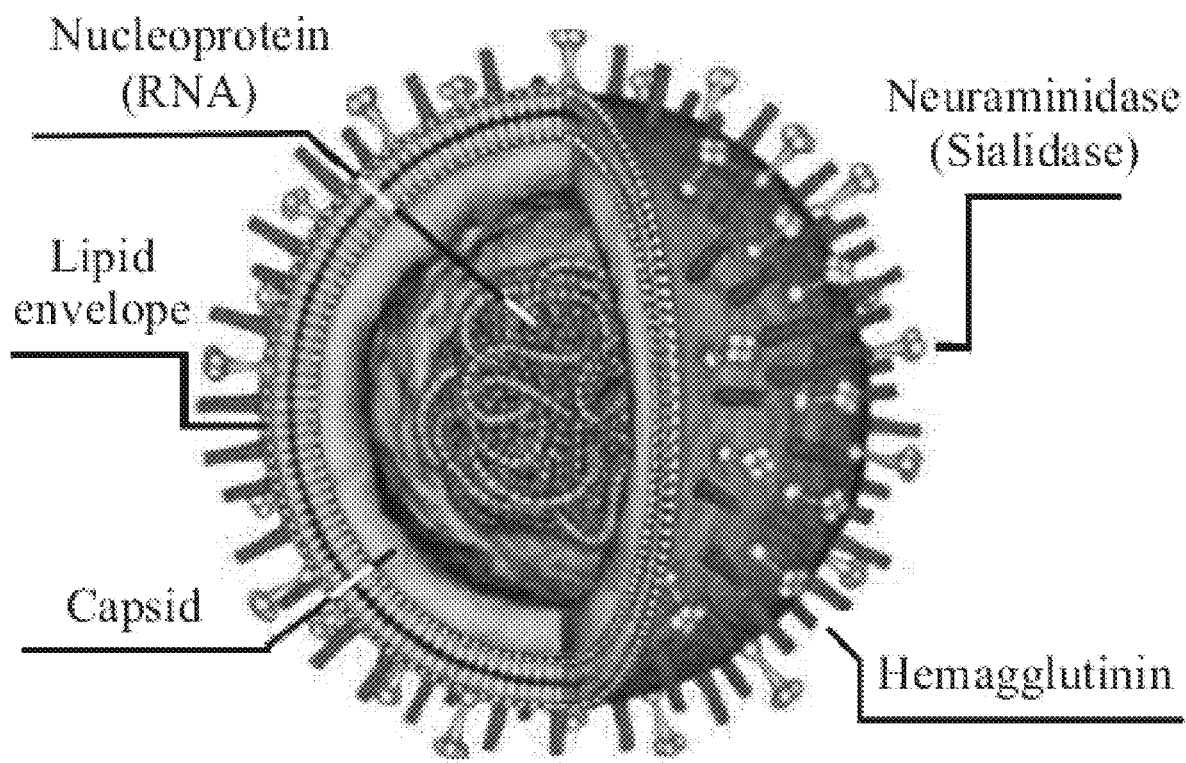
FIG. 1 is an illustration of the Influenza A virus.

FIG. 5 includes photographs of cells inoculated with different ratios of virus to slurry that had been exposed to various concentrations of $Si_3N_4$.

FIG. 6A shows a fluorescence microscopy image of MDCK cells before inoculation.

FIG. 6B shows a fluorescence microscopy image of MDCK cells after inoculation with a virus exposed to the control.

FIG. 6C shows a fluorescence microscopy image of MDCK cells after inoculation with a virus exposed to 30 wt. % $Si_3N_4$.

FIG. 7A is a graph of PFU/100 μl for Influenza A exposed to 15 wt. % $Si_3N_4$ for 1 minute, 5 minutes, 10 minutes, or 30 minutes at room temperature.

FIG. 7B is a graph of cell survivability of cells inoculated with Influenza A exposed to 15 wt. % $Si_3N_4$ for 1 minute, 5 minutes, 10 minutes, or 30 minutes at room temperature.

FIG. 8A is a graph of PFU/100 μl for Influenza A exposed to 15 wt. % $Si_3N_4$ for 1 minute, 5 minutes, 10 minutes, or 30 minutes at 4° C.

FIG. 8B is a graph of cell survivability of cells inoculated with Influenza A exposed to 15 wt. % $Si_3N_4$ for 1 minute, 5 minutes, 10 minutes, or 30 minutes at 4° C.

FIG. 9A shows the Raman spectrum of Influenza A virus before inactivation.

FIG. 9B shows changes in the Raman spectrum of the Influenza A virus relevant to chemical modifications in RNA and hemagglutinin after inactivation after 1 minute of exposure.

Figure 10:
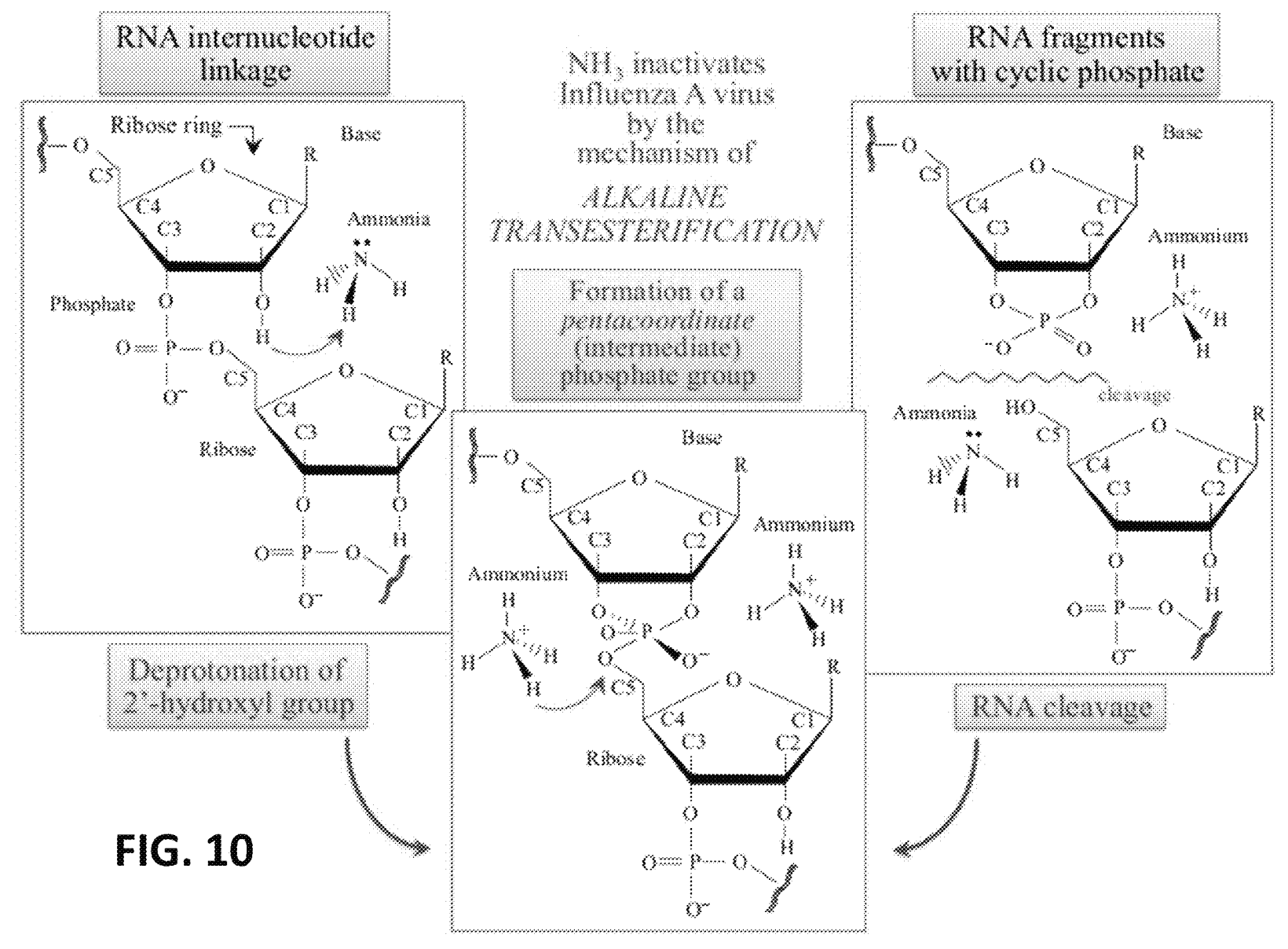

FIG. 10 shows $NH_3$ inactivates Influenza A virus by the mechanism of alkaline transesterification.

FIG. 11 shows O—P—O stretching in pentacoordinate phosphate group after inactivation.

FIG. 12A shows vibrational modes of methionine in the hemagglutinin structure.

FIG. 12B shows methionine's structural change in the presence of ammonia.

FIG. 13 shows C—S stretching methionine to homocysteine after inactivation.

FIG. 14A is a graph of PFU/100 μl for Feline calicivirus exposed to 15 wt. % or 30 wt. % $Si_3N_4$ for 1 minute, 10 minutes, or 30 minutes.

FIG. 14B is a graph of cell survivability of cells inoculated with Feline calicivirus exposed to 30 wt. % $Si_3N_4$ for 1 minute, 10 minutes, 30 minutes, or 60 minutes.

FIG. 15A shows the H1H1 Influenza A virus (nucleoprotein, NP) stained red after 10 minutes of exposure to a slurry of 15 wt. % silicon nitride and after its inoculation into a biogenic medium containing MDCK cells stained green for the presence of filamentous actin (F-actin) proteins.

FIG. 15B shows the NP stained H1H1 Influenza A virus from FIG. 15A.

FIG. 15C shows the F-actin stained MDCK cells from FIG. 15A.

FIG. 16A shows the H1H1 Influenza A virus (nucleoprotein, NP) stained red without exposure to silicon nitride and after its inoculation into a biogenic medium containing MDCK cells stained green for the presence of filamentous actin (F-actin) proteins.

FIG. 16B shows the NP stained H1H1 Influenza A virus from FIG. 16A.

FIG. 16C shows the F-actin stained MDCK cells from FIG. 16A.

FIG. 17 shows a trimodal distribution of silicon nitride powder.

FIG. 18 shows the viability of the MDCK cells as function of β-$Si_3N_4$ concentration (wt. %/mL).

FIG. 19 shows a direct comparison of the viral titers before and after exposure of Influenza A to the $Si_3N_4$ powder for 30 minutes.

FIG. 20 shows the viability of the MDCK cells as function of α-$Si_3N_4$ concentration (wt. %/mL).

FIG. 21 shows a comparison of the viral titers before and after exposure of Influenza A to the α-$Si_3N_4$ powder for 30 minutes.

FIG. 22 shows a trimodal particle size distribution of silicon nitride powder.

FIG. 23 is an overview of the antiviral testing method.

FIG. 24A shows Vero cell viability measured at 24 hours post-exposure to silicon nitride at concentrations of either 5, 10, 15 or 20 wt. %/vol (n=4) incubated with cell culture media for 1, 5, and 10 m.

FIG. 24B shows Vero cell viability measured at 48 hours post-exposure to silicon nitride at concentrations of either 5, 10, 15 or 20 wt. %/vol (n=4) incubated with cell culture media for 1, 5, and 10 m.

FIG. 25A shows titers of silicon nitride at concentrations of 5, 10, 15, and 20 wt. %/vol incubated with SARS-CoV-2 virus diluted in cell culture media for 1, 5, and 10 m expressed as PFU/mL.

FIG. 25B shows titers of silicon nitride at concentrations of 5, 10, 15, and 20 wt. %/vol incubated with SARS-CoV-2 virus diluted in cell culture media for 1, 5, and 10 m expressed as % inhibition.

FIG. 26A, FIG. 26B, FIG. 26C, and FIG. 26D are example antiviral face masks.

FIG. 27A, FIG. 27B, and FIG. 27C are example antiviral face masks.

FIG. 28A is a cross-section of the body of an example antiviral face mask.

FIG. 28B is a cross-section of the body of an example antiviral face mask.

FIG. 28C is a cross-section of the body of an example antiviral face mask.

FIG. 29 is an example method of manufacturing a fabric embedded with silicon nitride particles.

FIG. 30 is an example system for manufacturing a fabric embedded with silicon nitride particles.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Several definitions that apply throughout this disclosure will now be presented. Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

As used herein, the terms "comprising," "having," and "including" are used in their open, non-limiting sense. The terms "a," "an," and "the" are understood to encompass the plural as well as the singular. Thus, the term "a mixture thereof" also relates to "mixtures thereof."

As used herein, "about" refers to numeric values, including whole numbers, fractions, percentages, etc., whether or not explicitly indicated. The term "about" generally refers to a range of numerical values, for instance, 0.5-1%, 1-5% or ±5-10% of the recited value, that one would consider equivalent to the recited value, for example, having the same function or result.

The term "apparatus" as used herein includes compositions, devices, surface coatings, and/or composites. In some examples the apparatus may include various medical devices or equipment, examination tables, clothing, filters, masks, gloves, catheters, endoscopic instruments, and the like. The apparatus may be metallic, polymeric, and/or ceramic (ex. silicon nitride and/or other ceramic materials).

As used herein, the term "silicon nitride" includes $Si_3N_4$, alpha- or beta-phase $Si_3N_4$, SiYAlON, SiYON, SiAlON, or combinations of these phases or materials.

As used herein, "inactivate" or "inactivation" refers to viral inactivation in which the virus is stopped from contaminating the product or subject either by removing virus completely or rendering them non-infectious.

As used herein, "personal protective equipment" or "PPE" means any device, article, or apparatus worn or otherwise used by a person to minimize exposure to pathogens or other harmful substances. Non-limiting examples of PPE include body covers, head covers, shoe covers, face masks, eye protectors, face and eye protectors, and gloves.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Provided herein are antipathogenic devices, compositions, and apparatuses that include silicon nitride ($Si_3N_4$) for the inactivation of viruses, bacteria, and fungi. Silicon nitride possesses a unique surface chemistry which is biocompatible and provides a number of biomedical applications including 1) concurrent osteogenesis, osteoinduction, osteoconduction, and bacteriostasis, such as in spinal and dental implants; 2) killing of both gram-positive and gram-negative bacteria according to different mechanisms; 3) inactivation of human and animal viruses, bacteria, and fungi; and 4) polymer- or metal-matrix composites, natural or manmade fibers, polymers, or metals containing silicon nitride powder retain key silicon nitride bone restorative, bacteriostatic, antiviral, and antifungal properties.

In an embodiment, an antipathogenic composition may include silicon nitride. For example, the antipathogenic composition may include silicon nitride powder. In some embodiments, the antipathogenic composition may be a monolithic component comprising 100% silicon nitride. Such a component can be fully dense possessing no internal porosity, or it may be porous, having a porosity that ranges from about 1% to about 80%. The monolithic component may be used as a medical device or may be used in an apparatus in which the inactivation of a virus, bacteria, and/or fungi may be desired. In another embodiment, antipathogenic composition may be incorporated within a device or in a coating to inactivate viruses, bacteria, and fungi. In some embodiments, the antipathogenic composition may be a slurry comprising silicon nitride powder.

In some embodiments, the antipathogenic composition may inactivate or decrease the transmission of human viruses, bacteria, and/or fungi. Non-limiting examples of viruses that may be inactivated by the antipathogenic composition include influenza, enteroviruses, and coronaviruses (e.g. SARS-CoV-2, Influenza A, H1N1, enterovirus, and Feline calicivirus). For example, a silicon nitride bioceramic may be effective in the inactivation of the Influenza A virus. In another example, a silicon nitride powder may be effective in the inactivation of SARS-CoV-2. In some embodiments, a silicon nitride coating may decrease antibacterial and antiviral resistance and/or promote bone tissue restoration.

Without being limited to a particular theory, silicon nitride may provide a surface chemistry such that ammonia ($NH_3$) is available for virus, bacteria, or fungi inactivation. The surface chemistry of silicon nitride may be shown as follows:

$$Si_3N_4 + 6H_2O \rightarrow 3SiO_2 + 4NH_3$$

$$SiO_2 + 2H_2O \rightarrow Si(OH)_4$$

Nitrogen elutes faster (within minutes) than silicon because surface silanols are relatively stable. For viruses, it was surprisingly found that silicon nitride may provide for RNA cleavage via alkaline transesterification which leads to loss in genome integrity and virus inactivation. This may also reduce the activity of hemagglutinin.

In an embodiment, the antipathogenic composition may exhibit elution kinetics that show: (i) a slow but continuous elution of ammonia from the solid state rather than from the usual gas state; (ii) no damage or negative effect to mammalian cells; and (iii) an intelligent elution that increases with decreasing pH.

A device or apparatus may include silicon nitride on at least a portion of a surface of the device for antiviral, antibacterial, or antifungal action. In an embodiment, a device may include a silicon nitride coating on at least a portion of a surface of the device. The silicon nitride coating may be applied to the surface of the device as a powder. In some examples, the silicon nitride powder may be imbedded or impregnated in at least a portion of the device. In some embodiments, the powder may have particles in the micron, submicron or nanometer size range. The average particle size may range from about 100 nm to about 5 µm, from about 300 nm to about 1.5 µm, or from about 0.6 µm to about 1.0 µm. In other embodiments, the silicon nitride may be incorporated into the device. For example, a device may incorporate silicon nitride powder within the body of the device. In one embodiment, the device may be made of silicon nitride.

The silicon nitride coating may be present on the surface of a device or within the device in a concentration of about 1 wt. % to about 100 wt. %. In various embodiments, the coating may include about 1 wt. %, 2 wt. %, 5 wt. %, 7.5 wt. %, 8.3 wt. %, 10 wt. %, 15 wt. %, 16.7 wt. %, 20 wt. %, 25 wt. %, 30 wt. %, 33.3 wt. %, 35 wt. %, or 40 wt. % silicon nitride powder. In at least one example, the coating includes about 15 wt. % silicon nitride. In some embodiments, silicon nitride may be present in or on the surface of a device or apparatus in a concentration of about 1 wt. % to about 100 wt. %. In various embodiments, a device or apparatus may include about 1 wt. %, 2 wt. %, 5 wt. %, 7.5 wt. %, 8.3 wt. %, 10 wt. %, 15 wt. %, 16.7 wt. %, 20 wt. %, 25 wt. %, 30 wt. %, 33.3 wt. %, 35 wt. %, 40 wt. %, 50 wt. %, 60 wt. %, 60 wt. %, 70 wt. %, 80 wt. %, 90 wt. %, to 100 wt. % silicon nitride.

In various embodiments, a device or apparatus that includes silicon nitride for antipathogenic properties may be a medical device. Non-limiting examples of devices or apparatuses include orthopedic implants, spinal implants, pedicle screws, dental implants, in-dwelling catheters, endotracheal tubes, colonoscopy scopes, and other similar devices.

In some embodiments, silicon nitride may be incorporated within or applied as a coating to materials or apparatuses for antipathogenic properties such as polymers, fabrics, PPE, surgical gowns, tubing, clothing, air and water filters (e.g. home, industrial, or medical heating, ventilation, and air conditioning, filtration devices for anesthesia machines, ventilators, or CPAP machines), masks, tables such as hospital exam and surgical tables, desks, fixtures, handles, knobs, toys, or toothbrushes.

In an embodiment, the silicon nitride may be incorporated within PPE to inactivate or prevent the transmission of a virus in contact with the PPE. In one embodiment, the PPE is a mask and embedding the silicon nitride into at least a portion of the mask forms an antiviral face mask that captures and inactivates a virus in contact with the face mask. Without being limited to any one theory, the antiviral face mask may "capture and kill" a virus in contact with the silicon nitride within the face mask, such that the virus is not only captured within the face mask but also inactivated. The inactivation mechanism of silicon nitride may act rapidly to avoid cross-infection and the viruses may be neutralized in a strain-nonspecific way.

The use of the terms "antiviral face mask" or "face mask" herein may refer to a surgical face mask, a filtration face mask, a fabric washable mask, a respiration face mask, a cup-style respirator, a filtering facepiece respirator, an elastomeric half facepiece respirator, an elastomeric full facepiece respirator, a full coverage face mask, a half mask or full mask with cartridges, a half mask or full mask with canisters, a powered air-purifying respirator, or any mask operable to be worn on the face of the wearer to protect the wearer from a potential pathogen. In at least one example, the face mask may be a surgical face mask. In another example, the face mask is a respirator. The antiviral face mask may include silicon nitride on at least a portion of the mask. In some examples, the antiviral face mask may be disposable and intended for single-use. In other examples, the antiviral face mask may be reusable, such that it may be sterilizable and/or it may utilize replaceable filters.

Figure 26A:
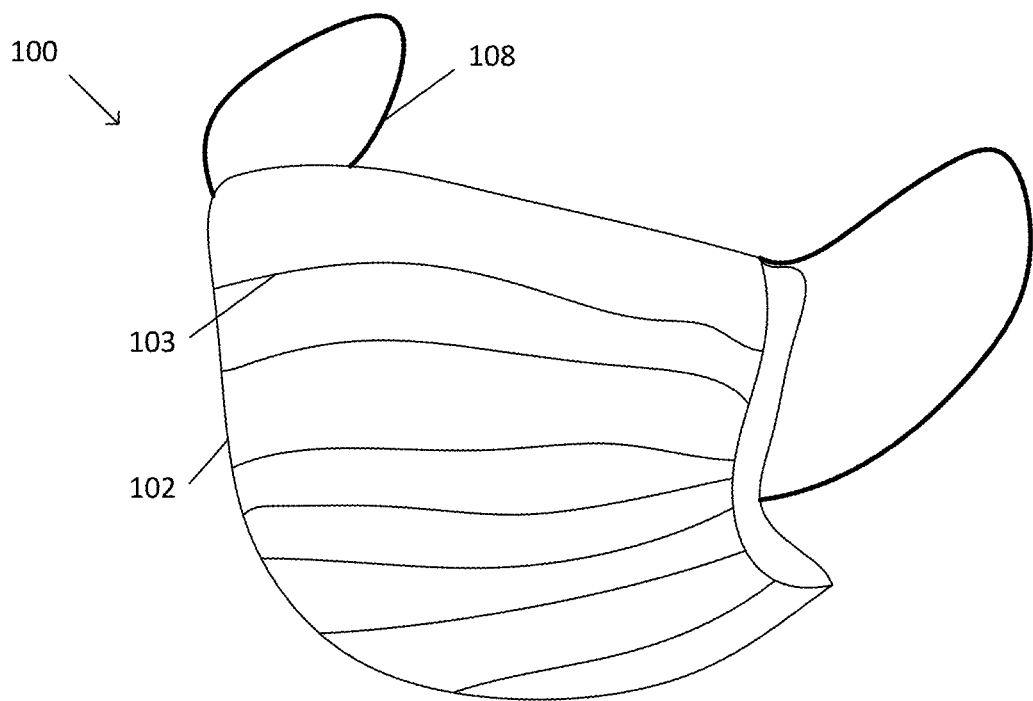
Figure 26B:
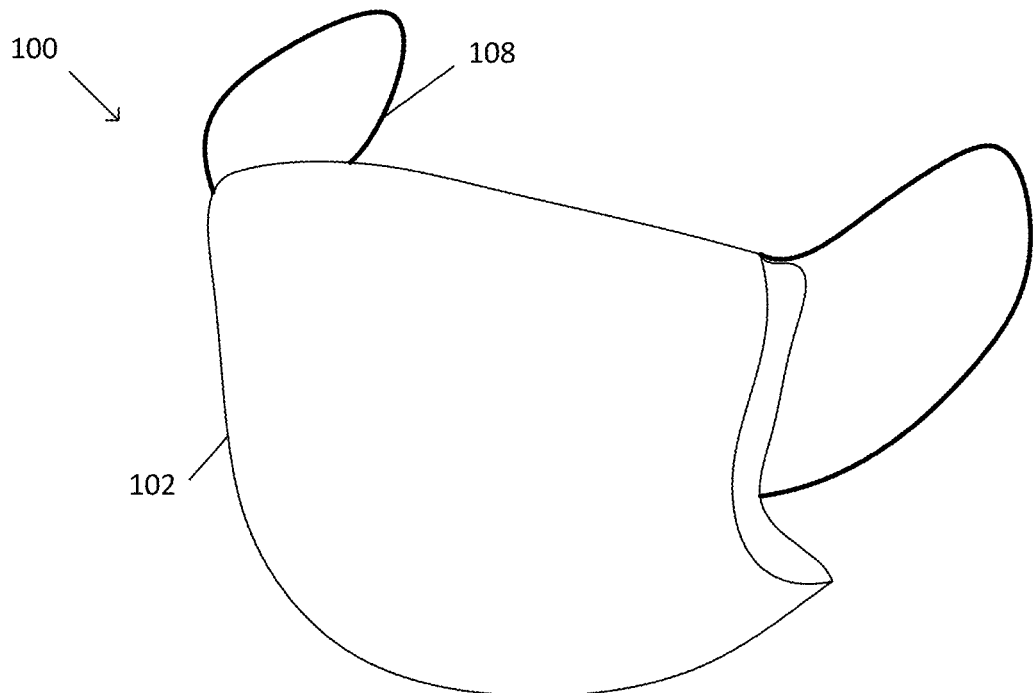

FIGS. 26A-26D are non-limiting examples of antiviral face masks that may include silicon nitride on at least a portion of the mask. Referring to FIG. 26A, in some embodiments, an antiviral face mask 100 may be a surgical mask. In this embodiment, the antiviral face mask 100 may include a face mask body 102 and one or more securing mechanisms 108 operable to secure the face mask body to the wearer. In some examples, the face mask body 102 may include one or more pleats 103 to aid the face mask in conforming to the wearer's face. FIG. 26B is an example antiviral face mask 100 with a face mask body 102 without pleats. In some embodiments, the face mask body 102 may include at least one layer with silicon nitride powder incorporated or embedded within the layer.

Figure 26C:
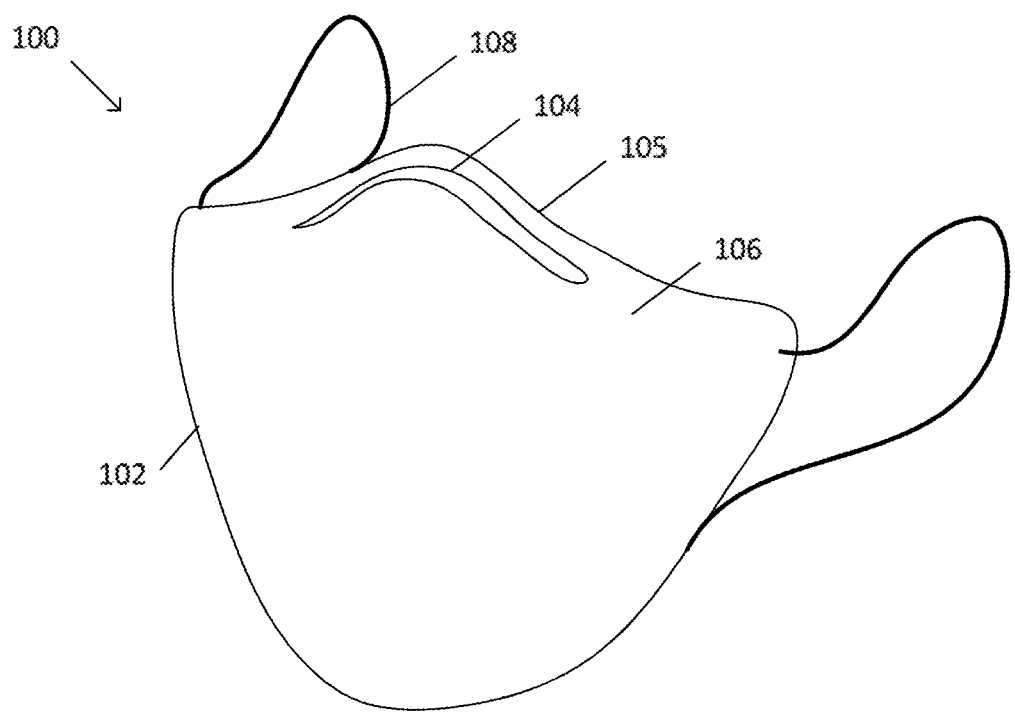
Figure 26D:
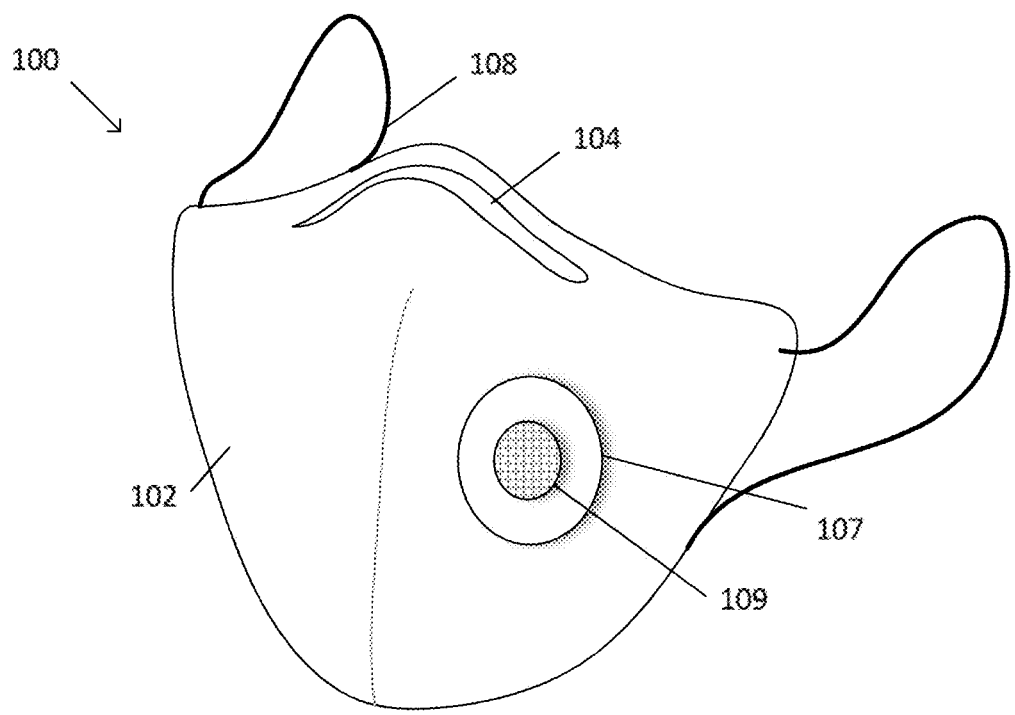

In some embodiments, as seen for example in FIG. 26C, the antiviral face mask 100 may be a cup-style respirator. In this embodiment, the antiviral face mask 100 may include a face mask body 102, one or more securing mechanisms 108, and a deformable strip 104 on a top portion of the face mask body 102 for adjusting the face mask 100 over the nose of the wearer. The deformable strip 104 may be attached near the top edge 105 of the face mask body 102 on the front surface 106. The deformable strip 104 may be made of a material which can be easily deformed by the wearer, including but not limited to plastic, spring steel wires encased in plastic, or malleable aluminum. In additional embodiments, as seen for example in FIG. 26D, the face mask body 102 may further include one or more ports/valves 107 or one or more filters 109 to be incorporated into the mask. In an example, the filter 109 may include silicon nitride powder incorporated or embedded within the filter. The silicon nitride may be in a layer or may be distributed homogenously throughout the filter. In some examples, the filter 109 may be disposable and replaceable.

In an embodiment, the antiviral face mask 100 may include a disposable, replaceable filter 109. In other embodiments, the face mask 100 may include a pocket (not shown) for receiving a disposable filter with silicon nitride powder incorporated or embedded within the filter. In additional embodiments, the antiviral face mask 100 may be made of washable fabric with a deformable strip 104, one or more securing mechanisms 108 (e.g. adjustable straps), a breathing valve 107 and/or a chin guard. The filter may be integral or insert-able into each of these mask configurations.

Figure 27A:
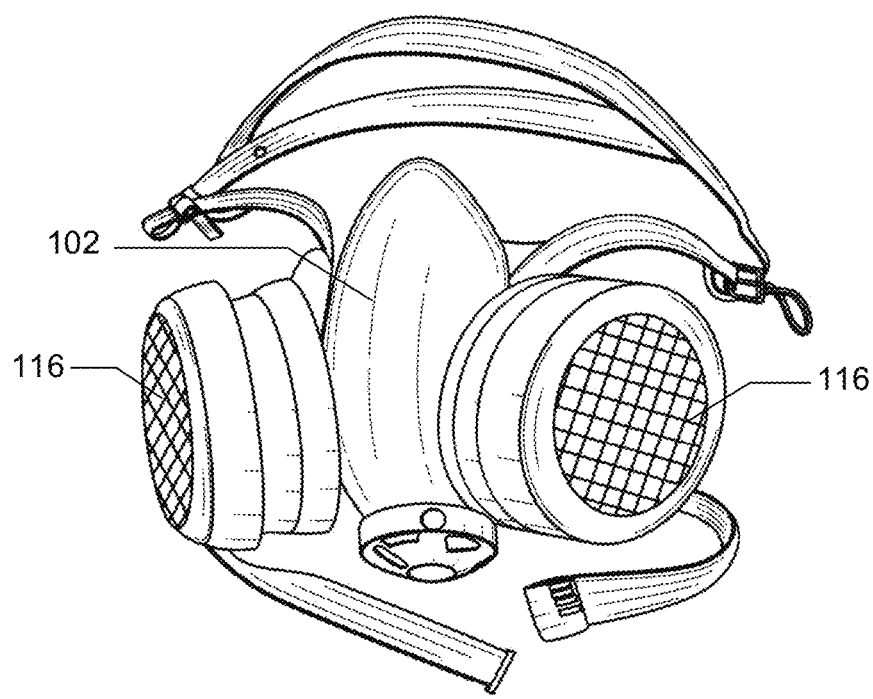
Figure 27B:
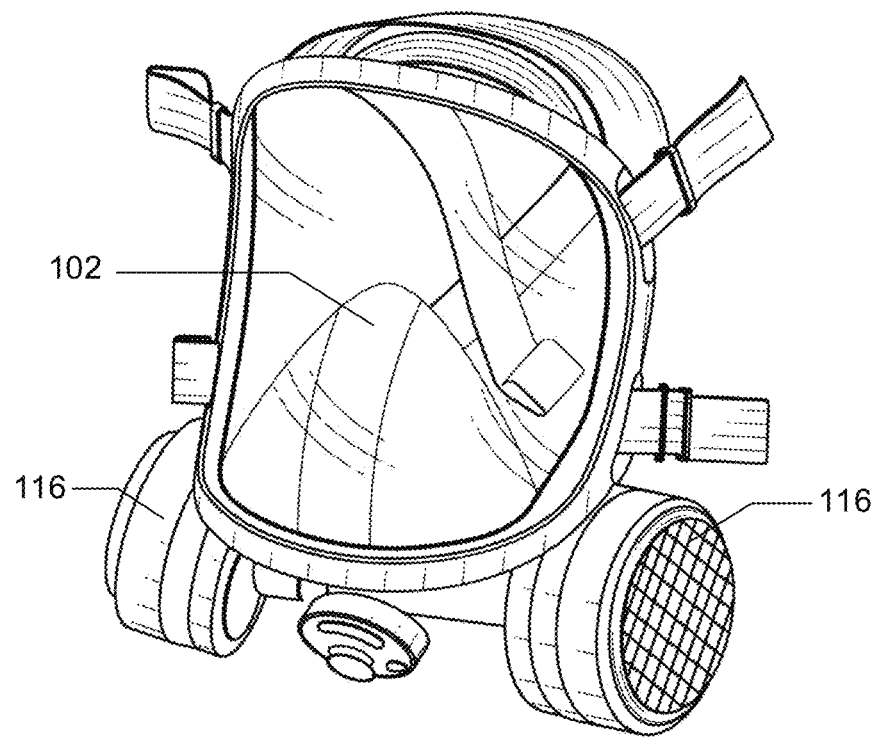
Figure 27C:
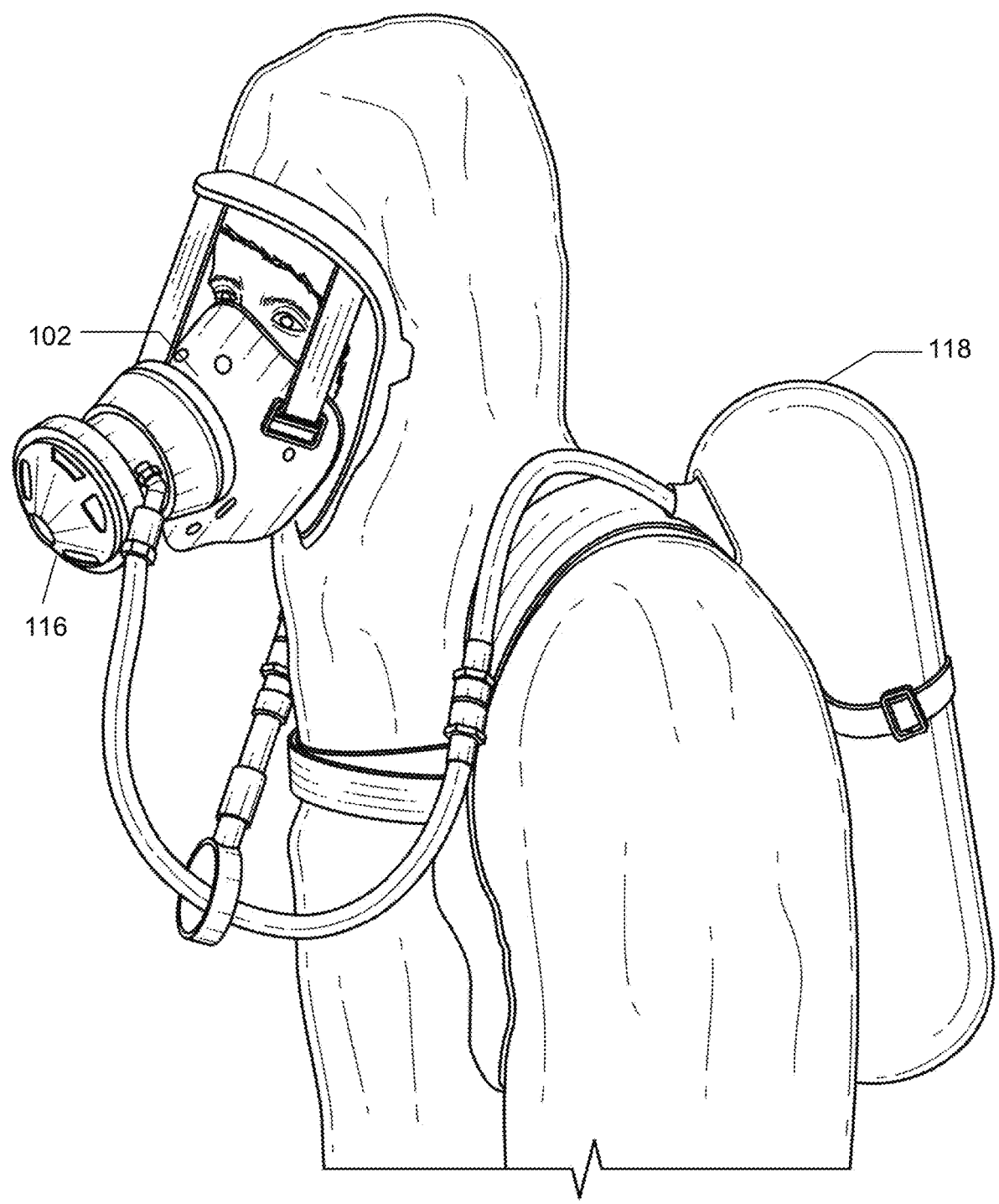

FIGS. 27A-27C show even more examples of face masks which may include silicon nitride within the mask, a filter inserted into the mask, a cartridge attached to the mask, and/or a canister attached to the mask. FIG. 27A is an example dual cartridge reusable half mask which may include silicon nitride in the face mask body 102 and/or in one or more cartridges 116. FIG. 27B is an example dual cartridge reusable full-face mask which may include silicon nitride in the face mask body 102 and/or in one or more cartridges 116. FIG. 27C is an example self-contained breathing apparatus which may include silicon nitride in the face mask body 102, one or more cartridges 116, and/or in one or more canisters 118.

Other non-limiting examples of masks include a particulate half mask which may include silicon nitride in the face mask body or filter, a dual cartridge disposable half mask which may include silicon nitride in the face mask body and/or in one or more cartridges, a canister type gas mask which may include silicon nitride in the face mask body and/or in one or more canisters, a powered air purifying respirator which may include silicon nitride in the face mask body and/or in one or more canisters, a continuous flow supplied air respirator which may include silicon nitride in the face mask body and/or in one or more canisters, and a full face mask with two inhalation valves operable to hold a filter or cartridge and an exhalation valve.

Referring again to FIGS. 26A-27C, the face mask 100 may be configured to be placed over the nose and mouth of the wearer and may include one or more securing mechanisms 108 for attaching the face mask to the wearer. The securing mechanism 108 may be one or more straps, loops, hooks, bands, or flaps for securing the face mask to the face of the wearer. The securing mechanism 108 may be made of an elastic material or any of the fibrous materials that the mask body is made of. In at least one example, the face mask 100 may include two loops 108, each of which are operable to be secured to the wearer's ears. In another example, the face mask 100 may include two straps, each of which are operable to be secured behind the wearer's head. In additional examples, the face mask 100 may include multiple straps or bands to be secured around the wearer's head. The outer layer 106 of the face mask body 102 may contact the face of the wearer, such that the fibrous material is not in direct contact with the wearer.

The face mask body 102 and/or filter 109 may include at least one layer, at least two layers, at least three layers, or at least four layers. In some embodiments, one or more layers of the face mask body may be made of a fibrous material. The fibrous material may be woven or nonwoven material and may be breathable or non-breathable. In some examples, the fibrous material may be a spunbond nonwoven fabric. Non-limiting examples of fibrous materials include polypropylene, rayon, polyester, cellulose, a non-oil resistant material such as KN95, N95, N97, N99, or N100 filters, an oil resistant material such as P95, P97, P99, or P100 filters, and/or a semi-oil resistant material such as R95, R97, R99, or R100 filters. Each layer of the face mask body may include the same or different fibrous materials. The fibrous material may have silicon nitride embedded with it. In some embodiments, the fibrous material may be removable and/or disposable. For example, in some examples, the layer containing the fibrous material and/or the filter may be removable from the rest of the mask body and may be disposed of after a single use.

Figure 28A:
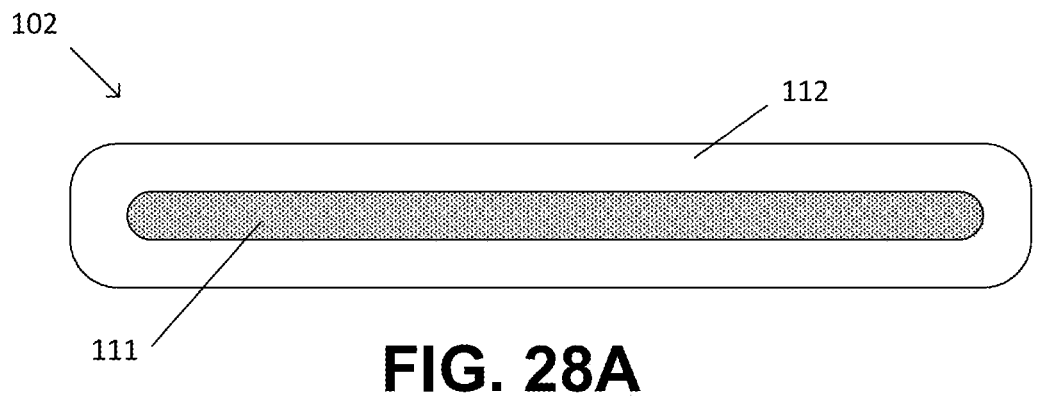
Figure 28B:
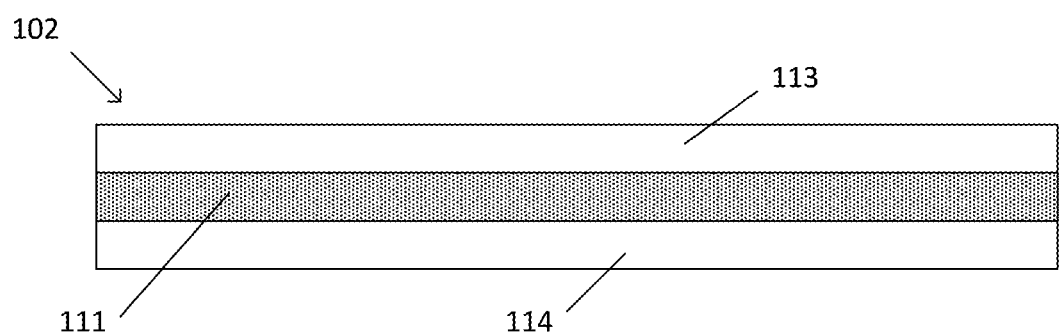
Figure 28C:
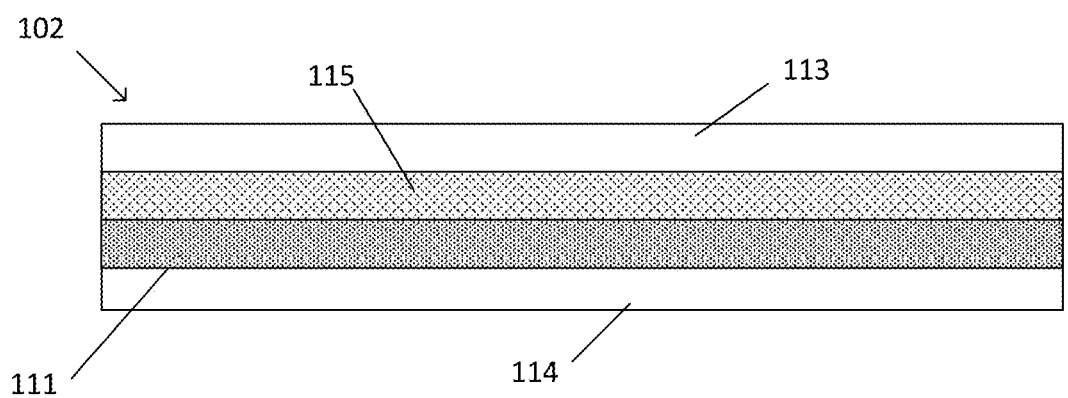

FIGS. 28A-28C are non-limiting examples of cross-sections of the face mask body 102 and/or filter 109. In one example, as shown in FIG. 28A, the face mask body 102 may include a fibrous material 111 and an outer layer 112. In this example, the face mask body 102 may have an outer layer 112 that surrounds the fibrous material 111, where silicon nitride powder is incorporated into or impregnated in the fibrous material 111 of the face mask body 102. The fibrous material 111 may be completely surrounded by the outer layer 112, such that the outer layer 112 essentially acts as a first and third layer with the fibrous material 111 being a second layer sandwiched between the first and third layers. FIG. 28B is an example cross-section of the face mask body 102 with three layers—a fibrous material 111 with silicon nitride, a first external layer 113, and a second external layer 114. In some examples, the first external layer 113 and the second external layer 114 may be made of the same material, such that they function similarly to a single outer layer 112 as seen in FIG. 28A. In other examples, the first external layer 113 and the second external layer 114 may be made of different materials. FIG. 28C is an example cross-section of the face mask body 102 with four layers, a fibrous material 111 with silicon nitride, a second inner layer 115, a first external layer 113, and a second external layer 114. In some examples, the first external layer 113 and the second external layer 114 may be made of the same material, such that they function similarly to a single outer layer 112 as seen in FIG. 28A. In other examples, the first external layer 113 and the second external layer 114 may be made of different materials. The fibrous material may comprise a nonwoven fabric, such as a spunbond fabric. In some examples, the fibrous material 111, the second inner layer 115, the first external layer 113, the second external layer 114, and/or the outer layer 112 may include, but are not limited to polypropylene, polyester, rayon, nylon, acrylic fibers, N95 filters, zinc, copper, silver, iodine, citric acid, ammonium citrate, or other compounds with antiviral properties. In additional examples, the second inner layer 115, the first external layer 113, the second external layer 114, and/or the outer layer 112 may include silicon nitride.

In some examples, the face mask body may further include one or more ports or pockets for receiving one or more filters, canisters, or cartridges. In various embodiments, if the face mask includes at least one filter, the filter may be layered similarly to the cross-sections in FIGS. 28A-28C. In some examples, the filter may include silicon nitride within at least a portion of the filter. In other examples, the filter may include an N95 filter or a carbon filter. In various examples, the filter may be disposable and replaceable.

In some embodiments, one or more layers of the face mask body and/or one or more filters may be coated with silicon nitride powder. In an example, the fibrous material or a filter may be coated with silicon nitride. Standard coating methods known in the art may be used to coat the face mask body or filters.

In other embodiments, silicon nitride may be embedded, incorporated, or impregnated into a layer of the face mask body, a filter, a canister, or a cartridge using methods including but not limited to electrospinning, melt-spinning, melt-blowing, weaving, or ultrasonic impregnation/embedding.

Figure 29:
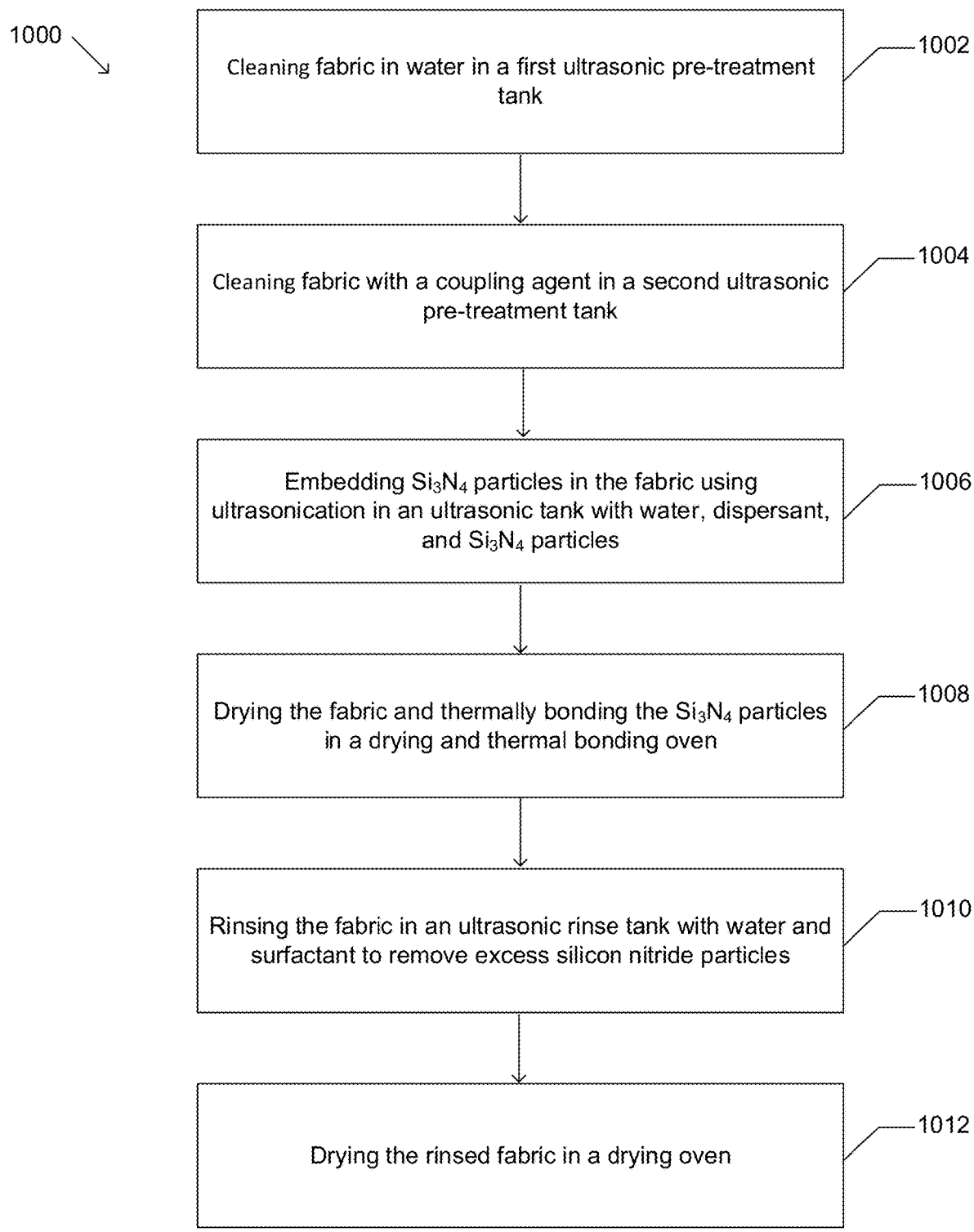
Figure 30:
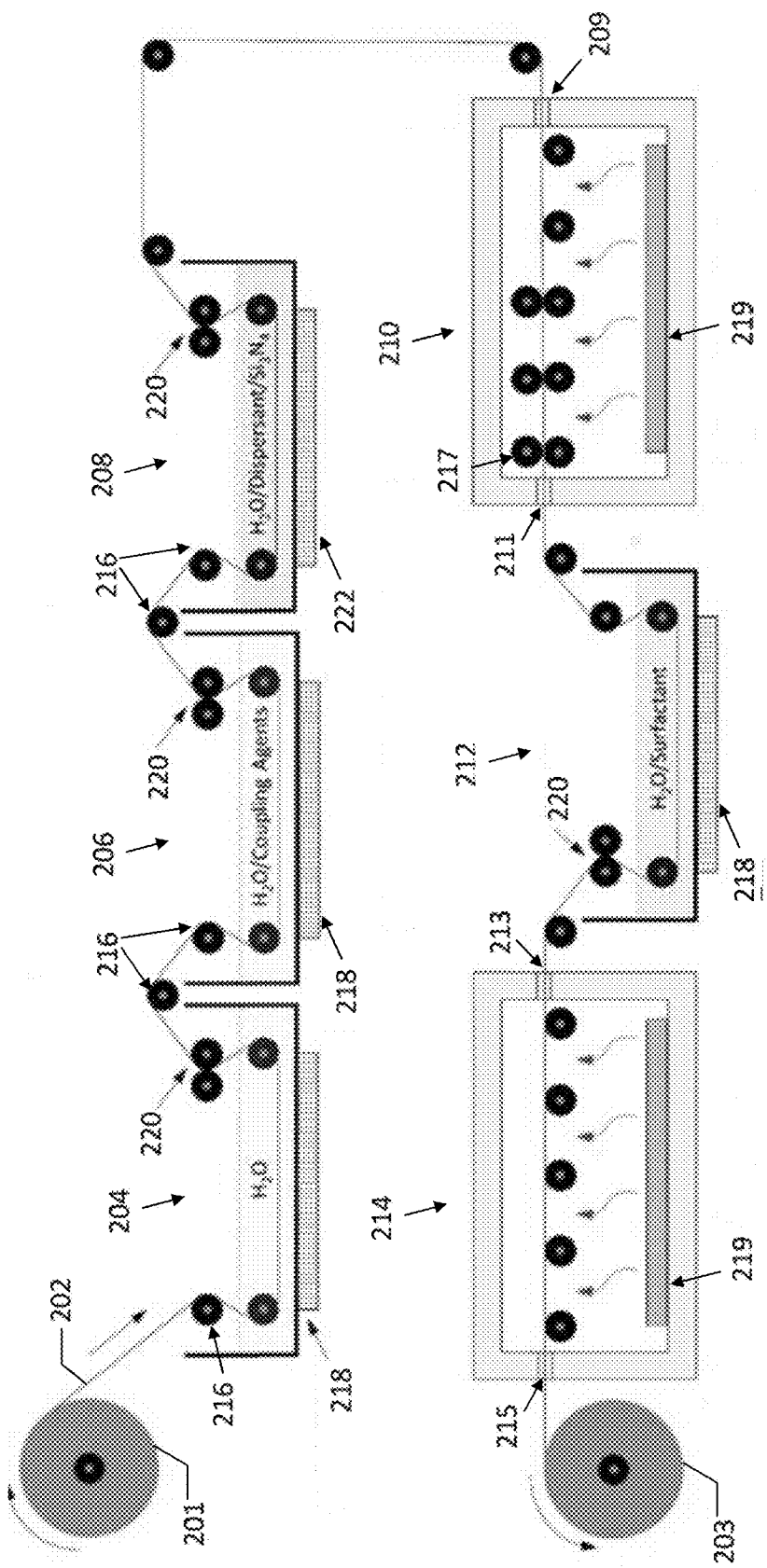

In an embodiment, silicon nitride may be embedded into nonwoven fabric, such as polypropylene, using an ultrasonic treatment. The resulting silicon nitride embedded fabric may be used to form any PPE. A multiple-step process may be used to achieve the appropriate surface chemistry, attachment, and activation of the $Si_3N_4$ particles to the fabric. FIG. 29 is an example manufacturing method 1000 and FIG. 30 is an example manufacturing system 200 to embed silicon nitride into nonwoven spunbond polypropylene fibers.

Based on packaging, transportation, or storage, a nonwoven fabric (i.e., scrim) may need pre-cleaning. The purpose of the pre-treatment step(s) is therefore to clean the fabric, improve its wetting characteristics, and add the coupling agent. First, the fabric 202 is pre-treated to improve cleanliness and wettability. In step 1002, the fabric 202 is cleaned in hot deionized water in a first ultrasonic pre-treatment tank 204 as a first pre-treatment step. The construction of the tank 204 allows the fabric 202 scrim to continuously move under roller 216 tension through the pre-treatment water-bath at a distance of between about 8 and 10 cm above the bottom of the tank. Ultrasonic transducers 218 may be located on the exterior bottom of the tank. In some examples, the ultrasonic transducers 218 may be operating at ≥1000 W 25 kHz ultrasonic energy and up to 2000 W of thermal energy. The pre-treatment water-bath temperature may be set at 95° C.≤T≤100° C. The residence time of the fabric 202 in the bath may be up to about 5, 10, 15, or 20 minutes. For instance, if the length of the fabric 202 in the pre-treatment tank 204 at any one time is about 60 cm, then speed of the fabric 202 through the bath may be 6 cm/min. The purpose of this first pre-treatment tank 204 is to remove organic chemicals and loosely adherent contamination. The pre-treatment tank 204 operates under a continuous circulation and filtration system to remove the contaminants from the water. Upon exiting the pre-treatment tank 204, a pressure wringer 220 squeezes excess water from the fabric 202.

In step 1004, the fabric is treated with a coupling agent in a second ultrasonic pre-treatment tank 206 as a second pre-treatment step. The second ultrasonic pre-treatment tank may contain a water-bath with an organic coupling agent. The coupling agent may facilitate bonding of the $Si_3N_4$ particles to the fabric. Various examples of the coupling agent include quaternary ammonium compounds (bromides), hydroxides, fluorides, or chlorides that may vary in carbon chain length but have the same or similar functional groups. In one embodiment, the coupling agent is n-dodecyl trimethyl ammonium bromide (DTAB). In another embodiment, the coupling agent may be dioctadecyl dimethyl ammonium bromide (DODA). The water-bath may contain the coupling agent in water at a weight ratio of about 1:200 to about 1:1000. For example, a 1:200 ratio may be 1 g of DTAB in 200 g of water and a 1:1000 ratio may be 1 g of DTAB in 1,000 g of water (i.e., 1 g per liter). Ultrasonic transducers 218 may be located on the exterior bottom of the tank. In some examples, the second ultrasonic pre-treatment tank 206 may be operating at identical conditions to the first pre-treatment tank 204. Because the coupling agent will adsorb onto the fabric during the process, replenishment of the solution will be needed. This may be accomplished via a metered addition system coupled with mechanical stirring within the ultrasonic pre-treatment tank 206 itself, or as a separate larger mixing tank that is plumbed to the ultrasonic pre-treatment tank 206 using a recirculation pumping system (not shown). Upon exiting the second ultrasonic pre-treatment tank 206, a pressure wringer 220 squeezes excess water from the fabric 202, and a heated air blower (not shown) operating at about 100° C. may be used to remove residual moisture from the fabric 202.

In step 1006, the $Si_3N_4$ particles are embedded in the fabric using ultrasonication in an ultrasonic tank 208 with water, a dispersant, and $Si_3N_4$ particles. In one embodiment, the fabric 202 scrim may be continuously fed into a third ultrasonic tank 208 which contains an aqueous $Si_3N_4$ dispersion. A $Si_3N_4$ slurry dispersion may be prepared prior to passing the fabric 202 through the ultrasonic tank 208. The composition of the slurry may include $Si_3N_4$ powder, a dispersant, and deionized water. The dispersant may be ammonium salts of various organic compounds such as ammonium citrate. The selection and use of dispersants is common for those knowledgeable in the art. In an example, the dispersant may be Dolapix A88. In at least one example, the slurry may include 210 g $Si_3N_4$ powder, 2.1 g Dolapix A88 dispersant, and 790 g deionized water. This composition corresponds to about 21 wt. % $Si_3N_4$ powder. The slurry composition may be adjusted to achieve the desired concentration of $Si_3N_4$ particles. Typically, the slurry composition may range from about 5 wt. % to about 40 wt. % $Si_3N_4$ particles. The slurry can be prepared in a separate mixing tank using a high-shear (propeller action) mixer with metered feeding of the $Si_3N_4$ powder, dispersant, and water (as needed) into the ultrasonic tank 208 using a recirculation pumping system (not shown). The embedding itself occurs within the ultrasonic tank 208. Similar to the pre-treatment, the ultrasonic transducer system 222 operates at ≥1000 W 25 kHz of ultrasonic energy and up to 2000 W of thermal energy, and at a temperature of 65° C.≤T≤75° C. The residence time of the fabric 202 within the ultrasonic tank 208 may be about 5, 10, 15, or 20 minutes. Using the prior example, if the length of the fabric 202 in the ultrasonic embedding tank 208 at any one time is about 60 cm, then speed of the fabric through the bath may be about 6 cm/min. Upon exiting the ultrasonic tank 208, a pressure wringer 220 squeezes excess slurry from the fabric 202.

Figure 21:
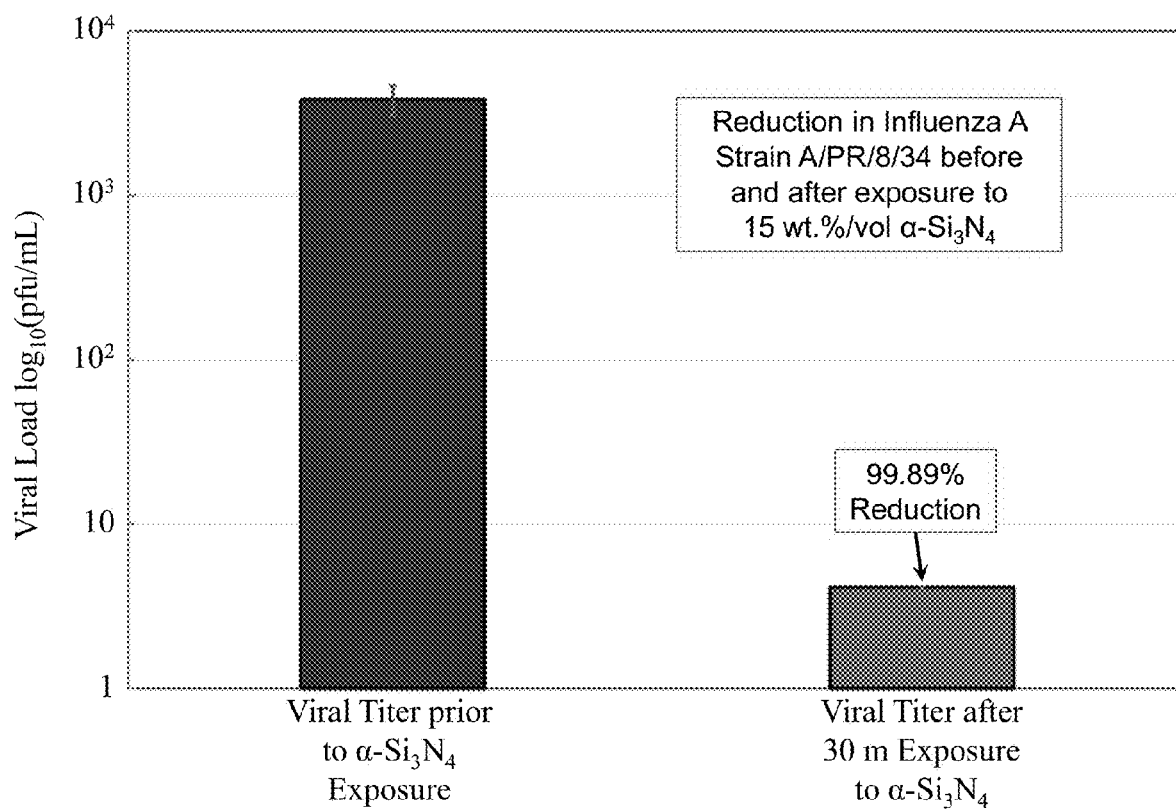

In step 1008, the fabric 202 is then dried and the $Si_3N_4$ particles are thermally bonded in a drying and thermal bonding oven 210. The thermal boding oven 210 may be fully enclosed with an inlet 209 and outlet 211 for the fabric and a heating element 219. Thermal bonding may be accomplished by continuously feeding the fabric 202 into an oven to dry the fabric and then passing it through a series of smooth-surfaced counter-rotating rollers 217 that simultaneously apply heat and pressure to the fabric (i.e., calendaring, as shown in FIG. 21). The oven 210 may be operated at 90° C.≤T≤100° C. and the calendaring rollers 217 may be operated at 140° C.≤T≤145° C. with an applied pressure of 500 psi (≥35 daN/cm). Alternatively, the fabric may be passed directly through preheated calendaring rollers without the necessity of going into a drying oven (not shown).

In step 1010, the fabric 202 is rinsed in an ultrasonic rinse tank 212 with water and surfactant to remove excess silicon nitride particles not embedded in the fabric. In some embodiments, washing and rinsing may be conducted as two separate steps. In one embodiment, they may be combined in one step. The prior thermal bonding operation may minimize the amount of non-embedded particles. This step may be conducted in a continuous ultrasonic bath similar to the ones used for the pre-treatment and embedding steps. The ultrasonic rinse tank 212 may include a separate larger mixing tank and recirculation system (not shown) with a pump like the other ultrasonic tanks. Within the recirculation system, replaceable cartridge-type submicron filters may be utilized to retain particles released from the fabric. The composition of the rinse may include a surfactant and water. In some examples, the surfactant may be Triton X-100. Ultrasonic transducers 218 may be located on the exterior bottom of the tank. Similar to the prior ultrasonic steps, the rinse step 1010 may be conducted at a power level of ≥1000 W 25 kHz ultrasonic energy, up to 2000 W of thermal energy, and at a temperature of 60° C.≤T≤70° C. with a residence time of the fabric within the ultrasonic tank at about 5, 10, 15, or 20 minutes. After rinsing, the fabric 202 may be passed through a wringer 220 to remove excess water.

In step 1012, the rinsed fabric 202 is dried in a drying oven 214. The thermal boding oven 214 may be fully enclosed with an inlet 213 and outlet 215 for the fabric and a heating element 219. In some embodiments, the fabric 202 scrim may be fed into the continuous drying oven 214 operating at about 110° C. for a residence time of about 5, 10, 15, or 20 minutes. The fabric 202 may subsequently be rolled onto a take-up roll 203.

The tanks and/or ovens associated with each step may be operatively connected such that a single roll of fabric 202 may pass through each tank and/or oven throughout the process. The fabric 202 may be provided as a continuous roll. For example, the fabric 202 may start at a source roll 201, be unwound as it is passed through the various tanks and ovens, and end in a take-up roll 203. In at least one example, the fabric may be nonwoven polypropylene spunbond fabric (i.e., scrim, ~45 g/m$^2$). Polypropylene is inherently hydrophobic (i.e., non-wetting). The fabric may be received as a continuous roll that is approximately 280 mm wide×~1 kilometer in length.

The silicon nitride incorporated in the PPE, face mask body, filter, canister, cartridge, etc. may be present at a concentration of about 1 wt. % to about 30 wt. %. In various examples, a fibrous material may include up to about 1 wt. %, up to about 2 wt. %, up to about 5 wt. %, up to about 7.5 wt. %, up to about 10 wt. %, up to about 15 wt. %, up to about 20 wt. %, up to about 25 wt. %, or up to about 30 wt. % silicon nitride powder embedded in the fibrous material. In at least one example, the silicon nitride in the fibrous material is present at a concentration of about 1 wt. % to about 15 wt. % throughout the fibrous material. In another example, the silicon nitride in the fibrous material is present at a concentration of less than about 10 wt. %. In various examples, a face mask or one or more filters of the face mask may include up to about 1 wt. %, up to about 2 wt. %, up to about 5 wt. %, up to about 7.5 wt. %, up to about 10 wt. %, up to about 15 wt. %, up to about 20 wt. %, up to about 25 wt. %, or up to about 30 wt. % silicon nitride powder. In at least one example, the silicon nitride in the fibrous material is present at a concentration of about 1 wt. % to about 15 wt. % throughout at least a portion of one or more filters in the face mask. In another example, the silicon nitride in the one or more filters is present at a concentration of less than about 10 wt. %. In some examples, silicon nitride may be present in a canister or cartridge attached to the face mask at a concentration of about 1 wt. % to about 15 wt. % throughout at least a portion of the canister or cartridge. In another example, the silicon nitride in the canister or cartridge is present at a concentration of less than about 10 wt. %.

In some embodiments, an organic acid may be further incorporated into the fibrous material or a layer of the mask. The acid may be selected from the group consisting of citric, malic, tartaric, succinic, oxalic, benzoic, isocitric, acetic, lactic, ascorbic, (e.g., acids commonly found in fruits and vegetables, and combinations thereof. In an embodiment, the acid may be intricately mixed with the silicon nitride powder and embedded in the mask at a concentration that ranges between 0.5 wt. % to 5.0 wt. % of the silicon nitride powder, and preferably in the range of 1.5 to 3.0 wt. %, and most preferably at about 2.0 wt. %.

Inclusion of one or a combination of these organic acids and its intricate mixture with silicon nitride acidifies the local environment and thereby activates the silicon nitride to release ammonia ($NH_3$). Without being bound to theory, during normal respiration by a wearer of the mask, moisture is passed through the mask during exhalation and inhalation. The moisture partially solubilizes the organic acid. It disassociates to a base and a hydronium ion. Using acetic acid as an example, the reaction is: $CH_3CO_2H + H_2O \leftrightarrows CH_3CO_2^- + H_3O^+$. This reaction decreases the local pH thereby creating an acidified environment in the immediate vicinity of the silicon nitride particles. In parallel, a chemical reaction occurs at the surface of silicon nitride in the presence of moisture that releases ammonia and ammonium as follows: $Si_3N_4 + 16H_2O \leftrightarrows 3Si(OH)_4 + 4NH_4OH \leftrightarrows 4NH_3 + 4H_2O$. The concentrations of the ammonium and ammonia in equilibrium varies with pH. As pH increases, the amount of eluted ammonium from the silicon nitride decreases. While the corresponding amount of eluted ammonia increases, its concentration is an order of magnitude lower than that of ammonium. The release of ammonium tends to drive the local pH higher, thereby slowing the reaction of silicon nitride with water in accordance with Le Chatelier's principle. Addition of the organic acid counters this effect. It drives the pH lower, and it reacts with some of the released ammonium. Using acetic acid as the example: $CH_3CO_2H + NH_4OH \leftrightarrows CH_3CO_2NH_4 + H_2O$. The products of the reaction consumes ammonium and releases water, which in turn, accelerates the reaction with silicon nitride. Therefore, addition of the organic acid to the local environment decreases the concentration of ammonium, and by so doing, the reaction of silicon nitride with water tends to increase. More ammonium is then released, also in accordance with Le Chatelier's principle. This effectively activates the silicon nitride. It reacts with more and more water to form more and more ammonia and ammonium. The release of these moieties is the fundamental mechanism behind the antipathogenic effectiveness of silicon nitride. In addition, these organic acids (e.g., citric) are may exhibit antipathogenic capabilities on their own, regardless of the foregoing reaction with silicon nitride but the primary purpose is to activate the silicon nitride as previously stated. Lastly, use of the mild organic acids does not create any biocompatibility or health hazards to the wearer of the mask due to their low concentration and eatable forms.

In some embodiments, a layer with the silicon nitride may inactivate a virus in contact with the layer of the antiviral face mask. For example, droplets or aerosols containing the virus are captured by the mask fibers and the silicon nitride powder inactivates them. Non-limiting examples of viruses that may be inactivated or prevented from being transmitted through the face mask include coronaviruses, SARS-CoV-2, Influenza A, Influenza B, enterovirus, and Feline calicivirus. The virus may be in contact with the silicon nitride powder for at least 30 seconds, at least 1 minute, at least 2 minutes, at least 3 minutes, at least 4 minutes, at least 5 minutes, at least 30 minutes, at least 1 hour, or at least 2 hours to be inactivated.

In other embodiments, silicon nitride powder may be incorporated into compositions including, but not limited to slurries, suspensions, gels, sprays, paint, or toothpaste. For example, the addition of silicon nitride to a slurry, such as paint, that is then applied to a surface may provide an antibacterial, antifungal, and antiviral surface. In other embodiments, silicon nitride may be mixed with water along with any appropriate dispersants and slurry stabilization agents, and thereafter applied by spraying the slurry onto various surfaces.

In an example, the antipathogenic composition may be a slurry of silicon nitride powder and water. The silicon nitride powder may be present in the slurry in a concentration of about 0.1 vol. % to about 20 vol. %. In various embodiments, the slurry may include about 0.1 vol. %, 0.5 vol. %, 1 vol. %, 1.5 vol. %, 2 vol. %, 5 vol. %, 10 vol. %, 15 vol. %, or 20 vol. % silicon nitride.

Further provided herein is a method of inactivating a pathogen by contacting a virus, bacteria, and/or fungus with an antipathogenic composition comprising silicon nitride. In an embodiment, the method may include coating a device or apparatus with silicon nitride and contacting the coated apparatus with the virus, bacterium, or fungus. Coating the apparatus may include applying a silicon nitride powder to a surface of the apparatus. In other embodiments, the silicon nitride powder may be incorporated or impregnated within the device or apparatus.

Without being limited to a particular theory, the antipathogenic composition may decrease viral action by alkaline transesterification and reduce the activity of hemagglutinin. It was surprisingly found that silicon nitride powder (i) remarkably decreases viral action by alkaline transesterification through the breakage of RNA internucleotide linkages and (ii) markedly reduced the activity of hemagglutinin thus disrupting host cell recognition by denaturing protein structures on viral surfaces leading to the inactivation of viruses regardless of the presence of a viral envelope.

In an embodiment, the antipathogenic composition may exhibit elution kinetics that show: (i) a slow but continuous elution of ammonia from the solid state rather than from the usual gas state; (ii) no damage or negative effect to mammalian cells; and (iii) an intelligent elution which increases with decreasing pH. Moreover, the inorganic nature of silicon nitride may be more beneficial than the use of petrochemical or organometallic bactericides, virucides, and fungicides which are known to harm mammalian cells or have residual effects in soil, on plants, and in vegetables or fruit.

It was also surprisingly found that silicon nitride particles may be electrically attracted to and attach to the spike proteins on the envelopes or membranes of the pathogens.

Also provided herein is a method of lysing or inactivating a pathogen at a location in a human patient. For example, the pathogen may be a virus, bacterium, or fungus. The method may include contacting the patient with a device, apparatus, or composition comprising silicon nitride. Without being limited to any one theory, the silicon nitride inactivates the pathogen. The device, apparatus, or composition may include about 1 wt. % to about 100 wt. % silicon nitride. In some examples, the device or apparatus may include about 1 wt. % to about 100 wt. % silicon nitride on the surface of the device or apparatus. In an embodiment, the device or apparatus may be a monolithic silicon nitride ceramic. In another embodiment, the device or apparatus may include a silicon nitride coating, such as a silicon nitride powder coating. In another embodiment, the device or apparatus may incorporate silicon nitride into the body of the device. For example, silicon nitride powder may be incorporated or impregnated into the body of the device or apparatus using methods known in the art.

In some embodiments, the device or apparatus may be contacted with the patient or user for at least 1 minute, at least 5 minutes, at least 30 minutes, at least 1 hour, at least 2 hours, at least 5 hours, or at least 1 day. In at least one example, the device or apparatus may be permanently implanted in the patient. In at least one example, the device or apparatus may be worn externally by a user.

EXAMPLES

Example 1: Effect of Silicon Nitride Concentration on Virus Inactivation

Figure 2A:
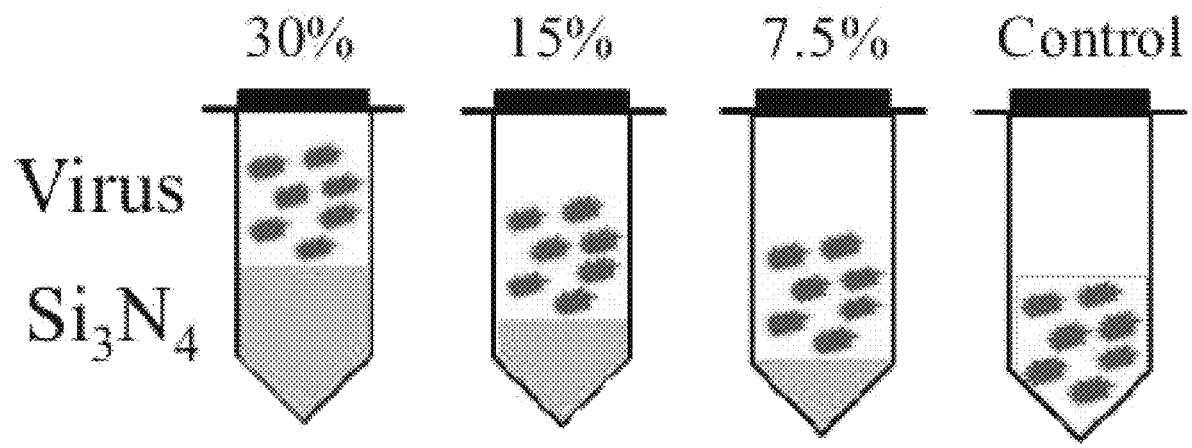
FIG. 2A is an illustration of a virus exposed to 0 wt. %, 7.5 wt. %, 15 wt. %, and 30 wt. % $Si_3N_4$ for 10 minutes.

To show the effect of silicon nitride concentration on the inactivation of viruses, Influenza A was exposed to various concentrations of $Si_3N_4$ powder. To prepare the silicon nitride, a specific weight of silicon nitride powder mixed with pure distilled water. For instance, 7.5 g of silicon nitride was dispersed in 92.5 g of pure distilled water. The virus was added to this mixture in concentrations of 1:1, 1:10 and 1:100 virus/mixture, respectively. These mixtures were then allowed to incubate under gentle agitation for 10 minutes at 4° C. Influenza A was exposed to 0 wt. %, 7.5 wt. %, 15 wt. %, and 30 wt. % $Si_3N_4$ for 10 minutes at 4° C., as illustrated in FIG. 2A. The mixtures were then filtered to remove the silicon nitride powder.

Figure 2B:
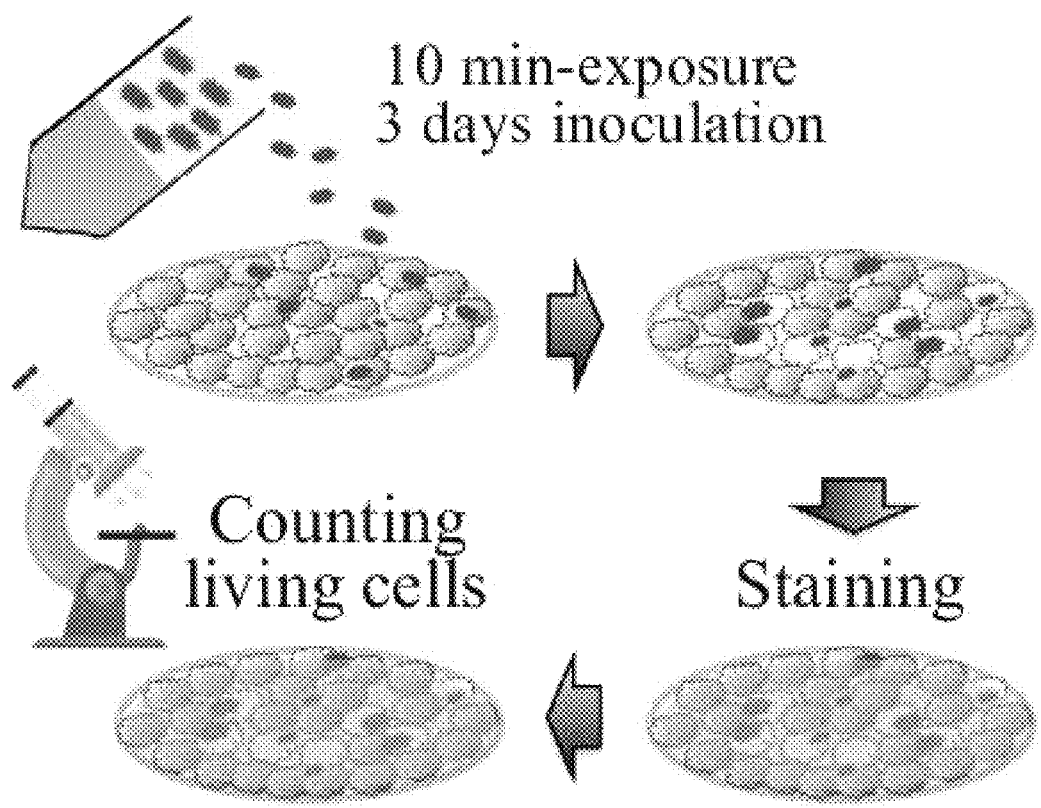
FIG. 2B is an illustration of methods used to determine viability of cells inoculated with a virus exposed to $Si_3N_4$ according to FIG. 2A.

Influenza A virus-inoculated Madin-Darby canine kidney (MDCK) cells were then observed for the effectiveness of $Si_3N_4$ in inactivating the Influenza A. The remaining mixtures were then inoculated into Petri dishes containing living MDCK cells within a biogenic medium. The amount of living MDCK cells were subsequently counted using staining methods after 3 days exposure. The viability of MDCK cells was determined after inoculating the cells for 3 days with Influenza A exposed to $Si_3N_4$ according to FIG. 2B.

Figure 4A:
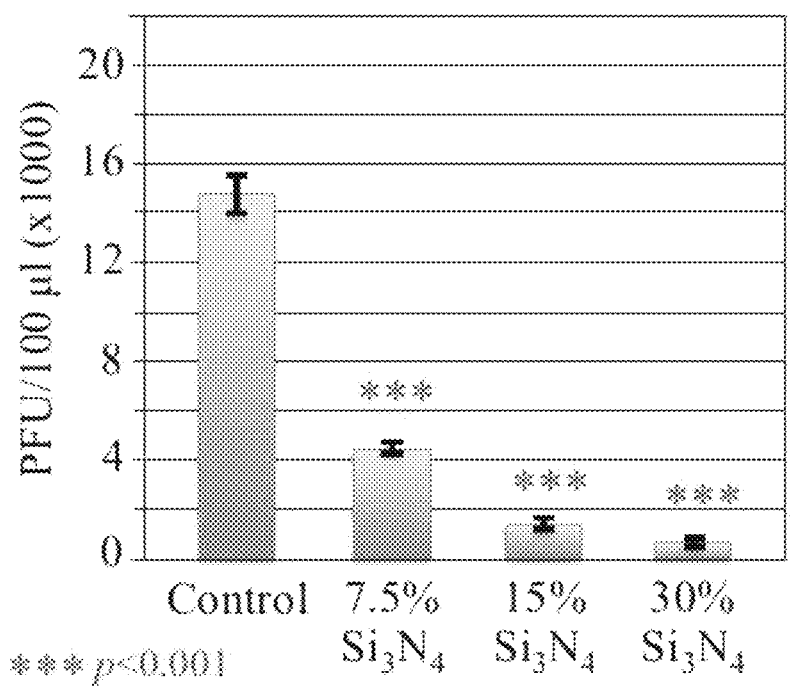
FIG. 4A is a graph of PFU/100 μl for Influenza A exposed to 0 wt. %, 7.5 wt. %, 15 wt. %, and 30 wt. % $Si_3N_4$ for 10 minutes according to FIG. 2A.
Figure 4B:
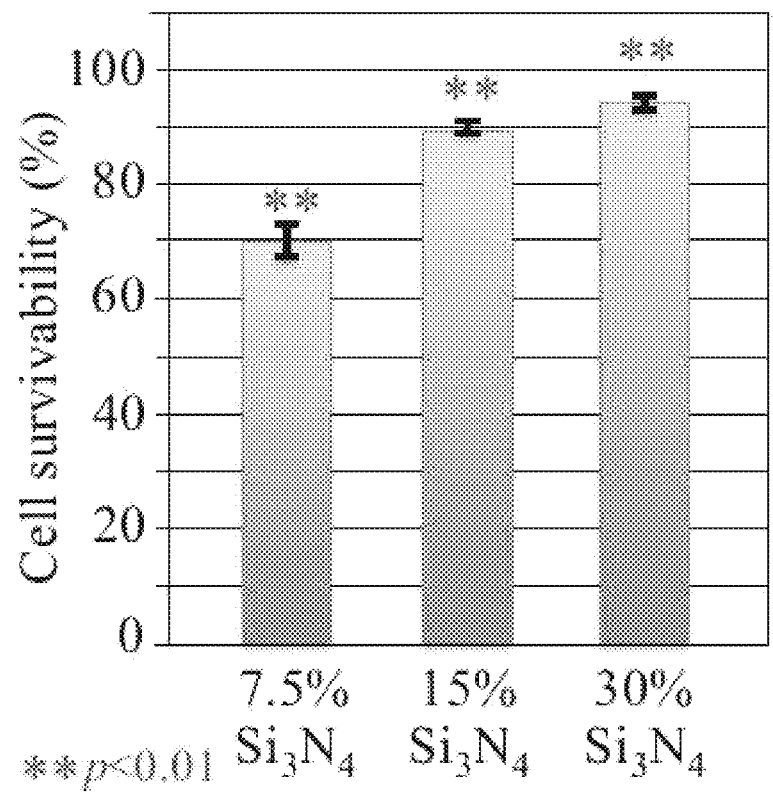
FIG. 4B is a graph of cell survivability of cells inoculated with Influenza A exposed to 7.5 wt. %, 15 wt. %, and 30 wt. % $Si_3N_4$ for 10 minutes according to FIG. 2B.
Figure 5:
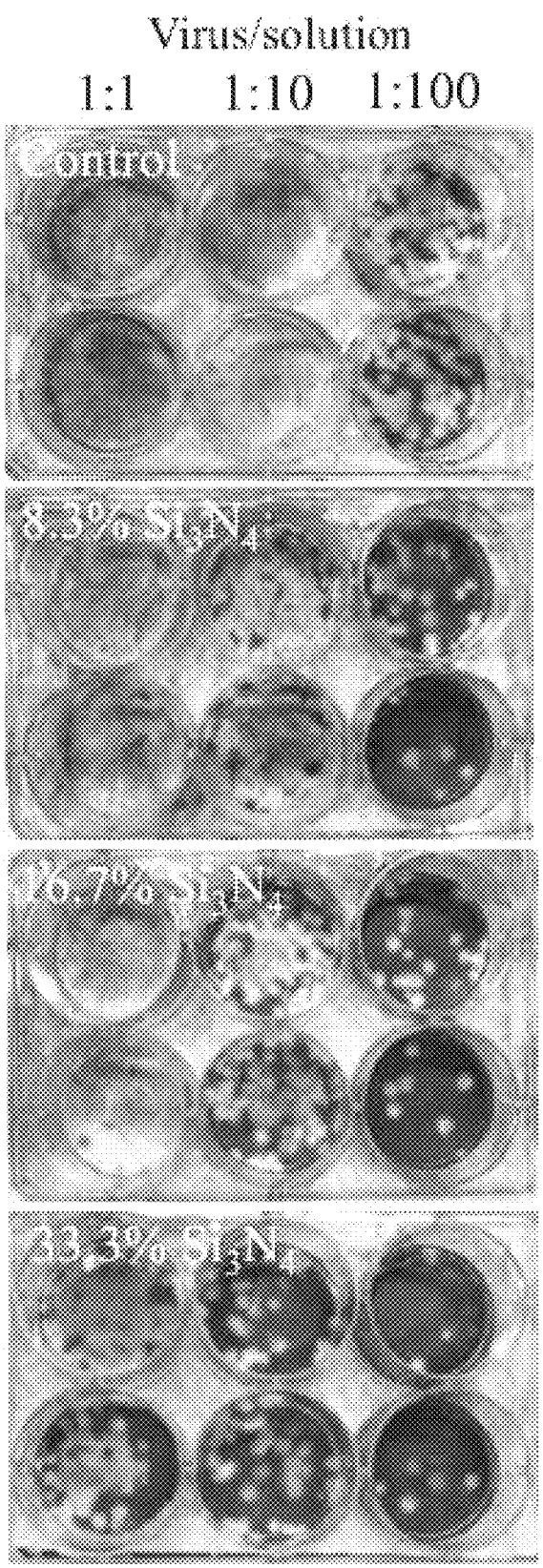

FIG. 4A is a graph of PFU/100 µl for Influenza A exposed to 0 wt. %, 7.5 wt. %, 15 wt. %, and 30 wt. % $Si_3N_4$ for 10 minutes. FIG. 4B is a graph of cell survivability of cells inoculated with Influenza A exposed to 7.5 wt. %, 15 wt. %, and 30 wt. % $Si_3N_4$ for 10 minutes.

Example 2: Effect of Exposure Time and Temperature on Virus Inactivation

Figure 3A:
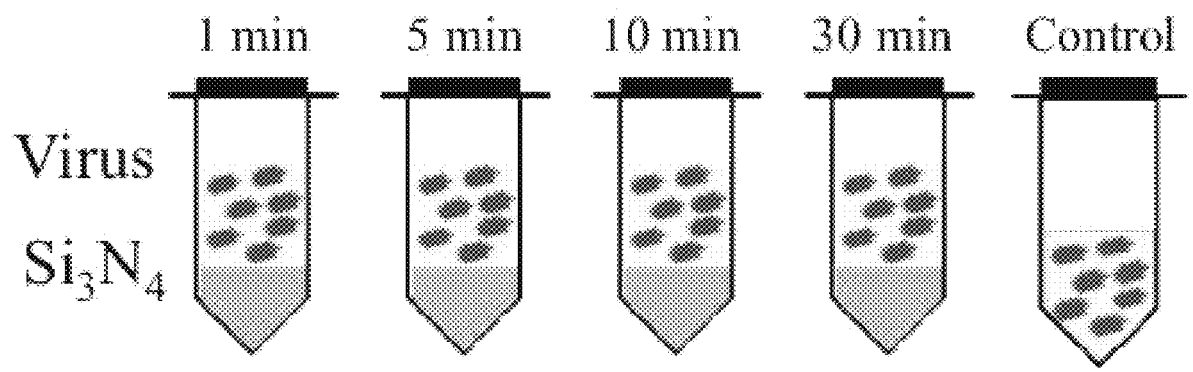
FIG. 3A is an illustration of a virus exposed to 15 wt. % $Si_3N_4$ for 1, 5, 10, and 30 minutes.
Figure 3B:
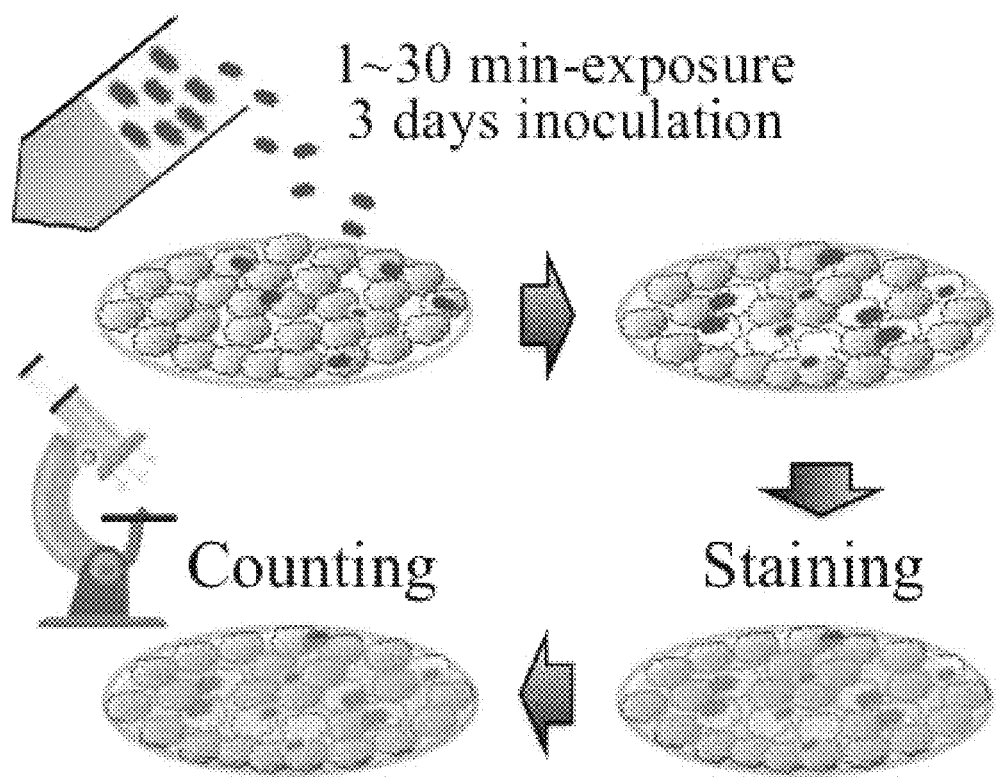
FIG. 3B is an illustration of methods used to determine viability of a virus after exposure to $Si_3N_4$ according to FIG. 3A.

To show the effect of silicon nitride on the inactivation of viruses, Influenza A was exposed to a fixed concentration of $Si_3N_4$ powder (15 wt. %) for various times and temperatures. The mixture was then allowed to incubate under gentle agitation for 1-30 minutes at room temperature and at 4° C. For example, Influenza A was exposed to 15 wt. % $Si_3N_4$ for 1, 5, 10, or 30 minutes at room temperature or 4° C., as illustrated in FIG. 3A. Influenza A virus-inoculated Madin-Darby canine kidney (MDCK) cells were then observed for the effectiveness of $Si_3N_4$ in inactivating the Influenza A. The viability of MDCK cells was determined after inoculating the cells for 3 days with Influenza A exposed to $Si_3N_4$ according to FIG. 3B.

Figure 7A:
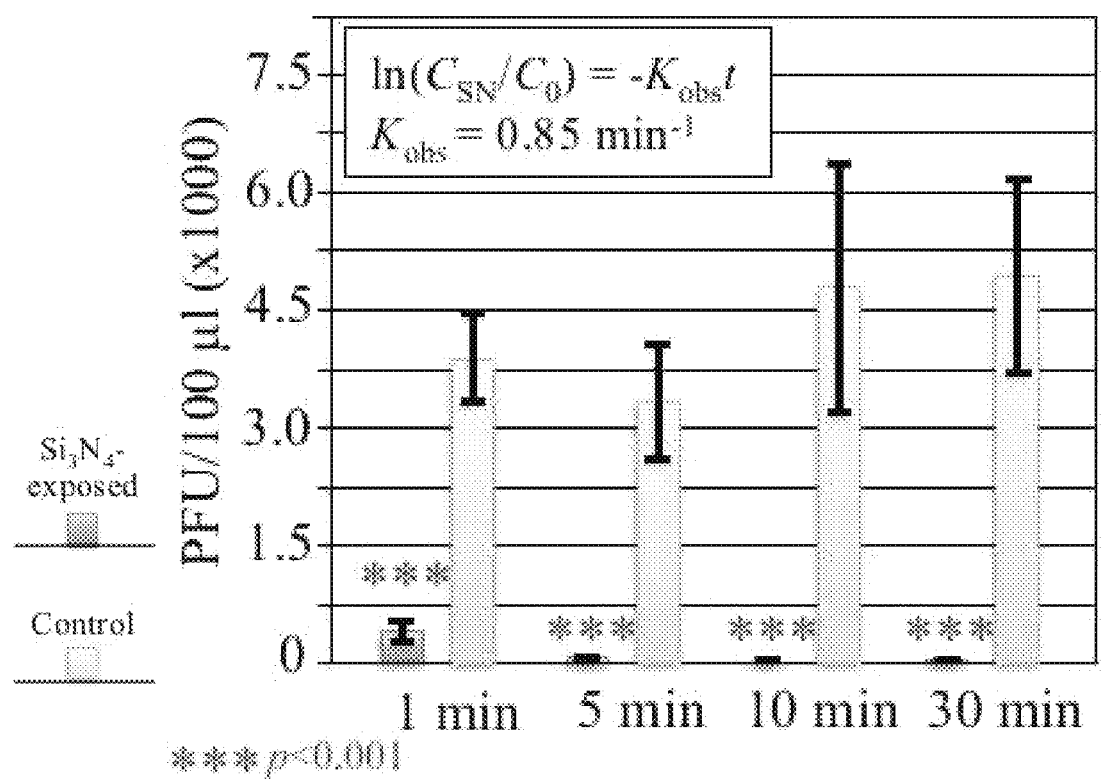
Figure 7B:
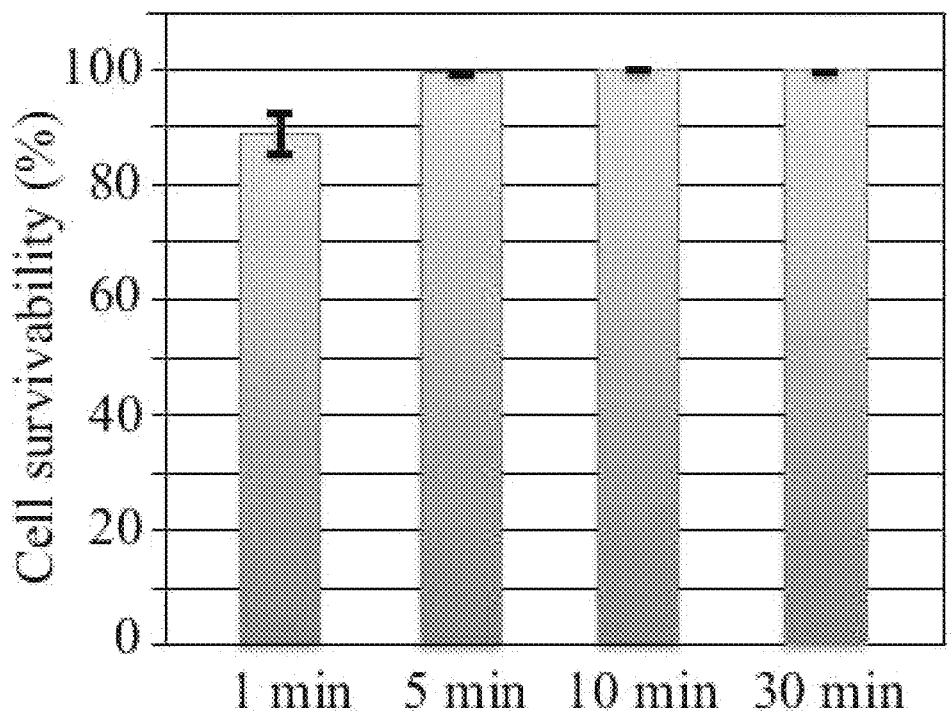

FIG. 7A is a graph of PFU/100 µl for Influenza A exposed to 15 wt. % $Si_3N_4$ for 1 minute, 5 minutes, 10 minutes, or 30 minutes at room temperature. FIG. 7B is a graph of cell survivability of MDCK cells inoculated with Influenza A exposed to 15 wt. % $Si_3N_4$ for 1 minute, 5 minutes, 10 minutes, or 30 minutes at room temperature.

Figure 8A:
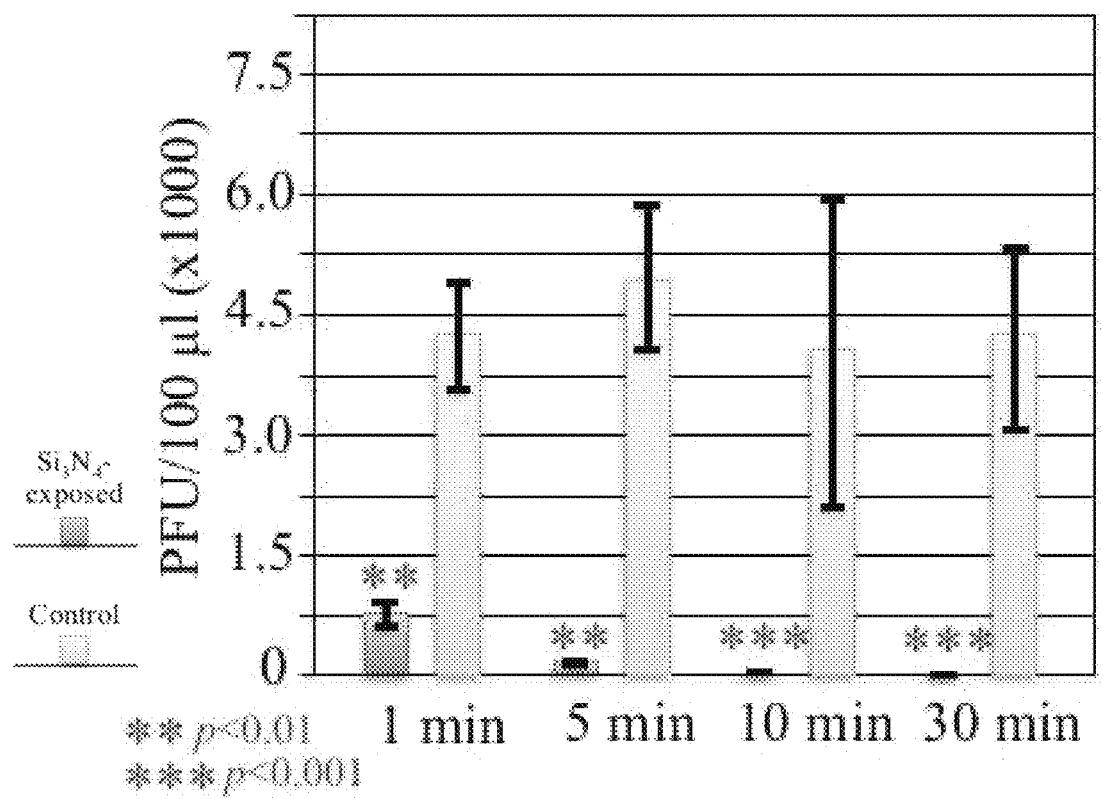
Figure 8B:
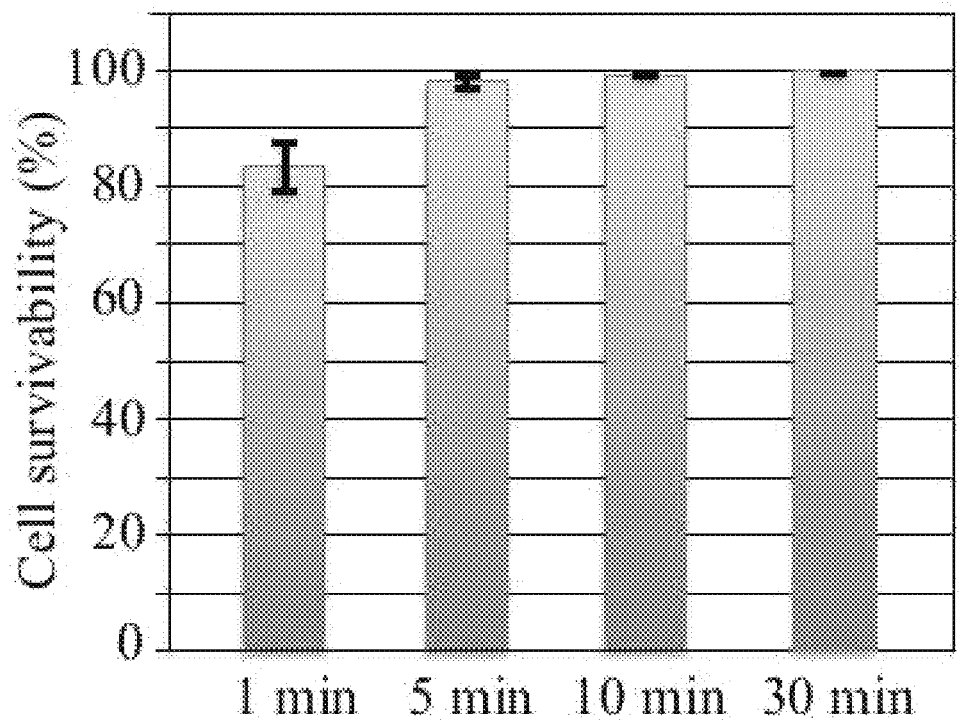
Figures 9A, 9B:
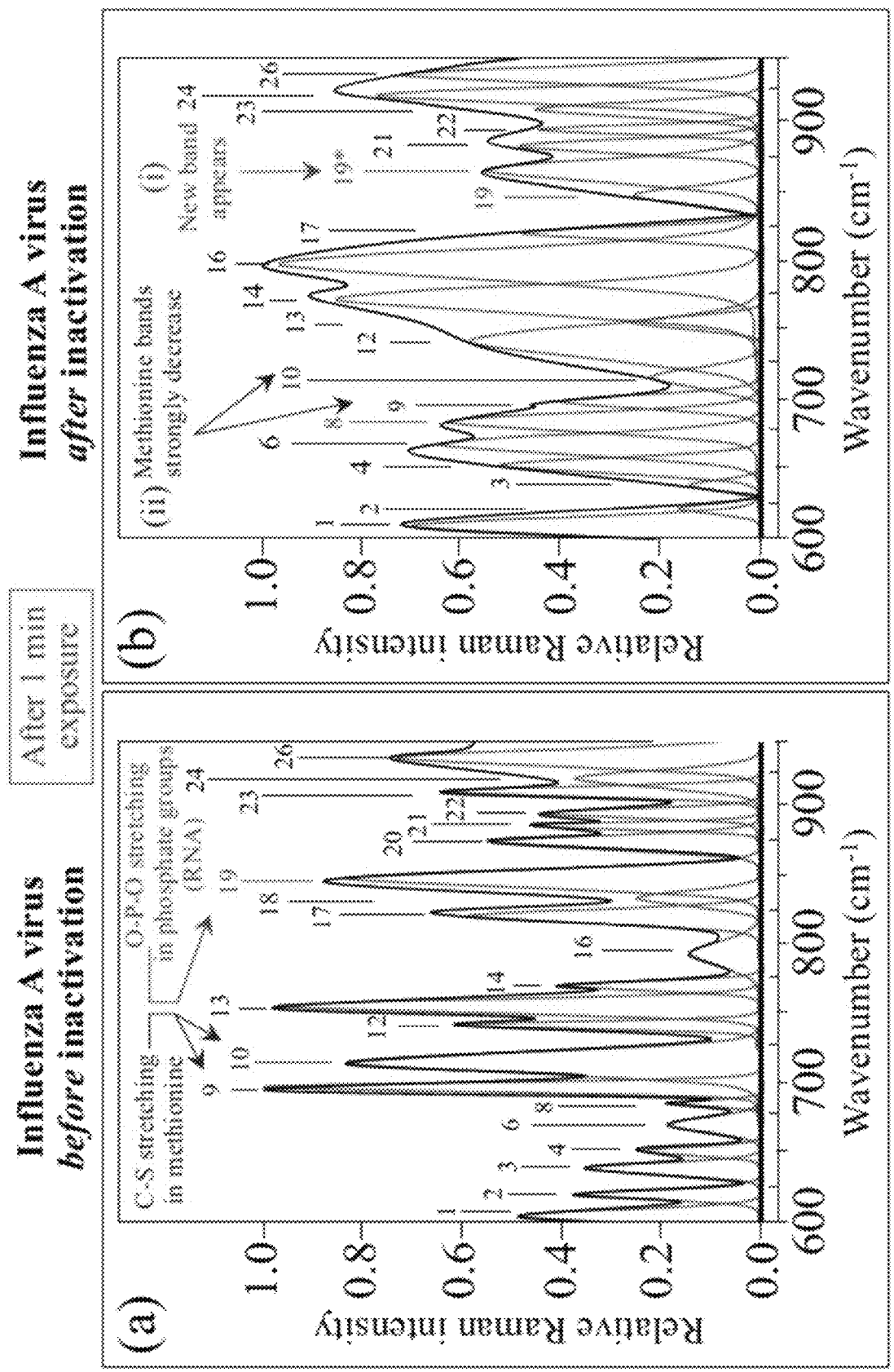
Figure 11:
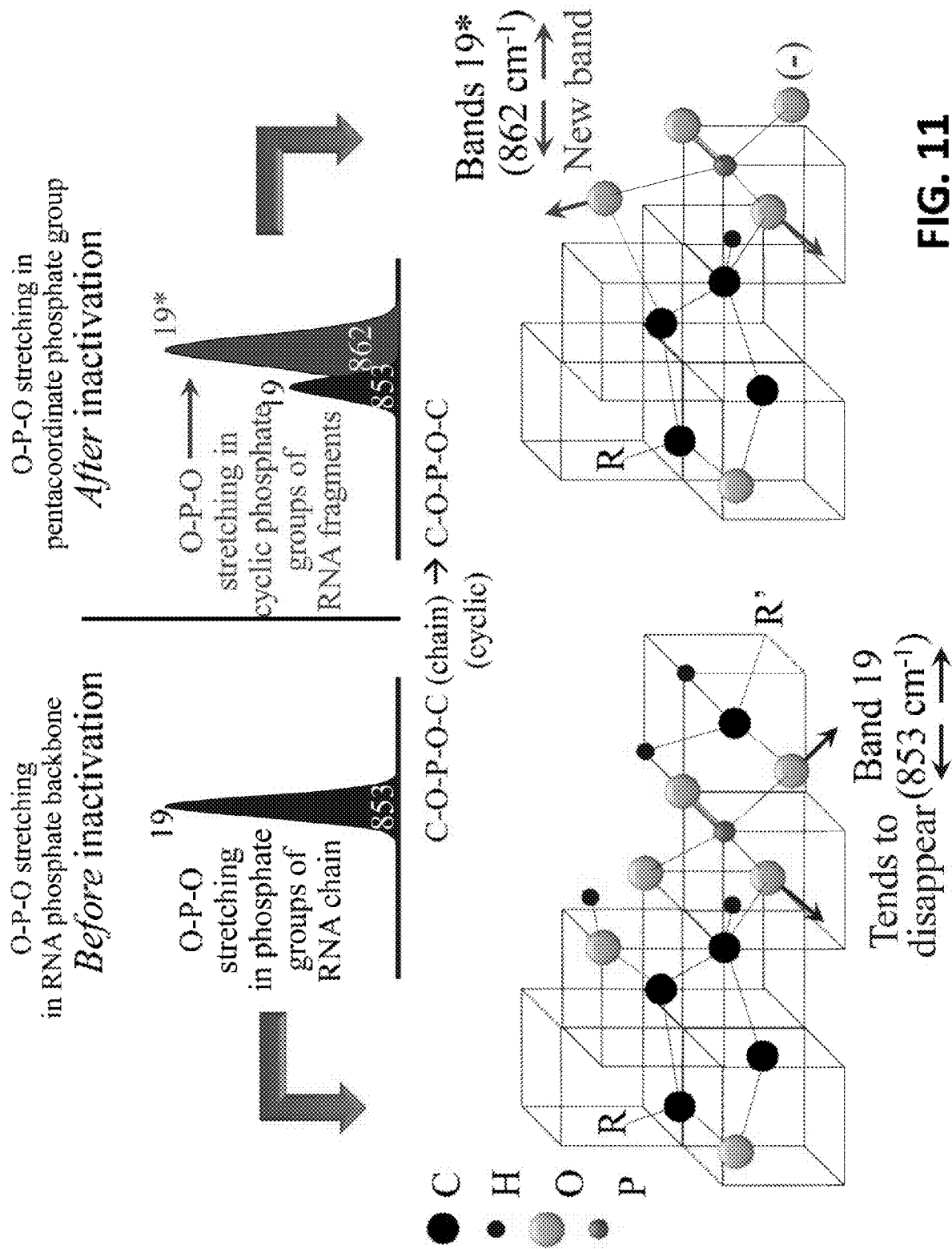
Figure 12B:
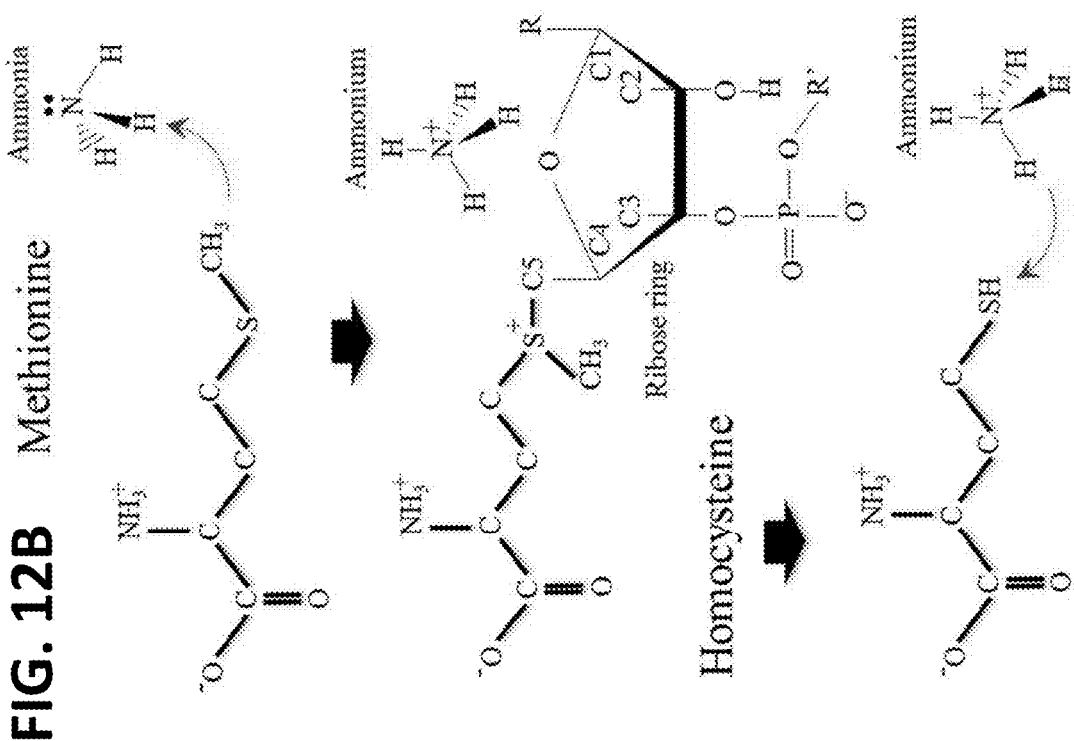
Figure 12A:
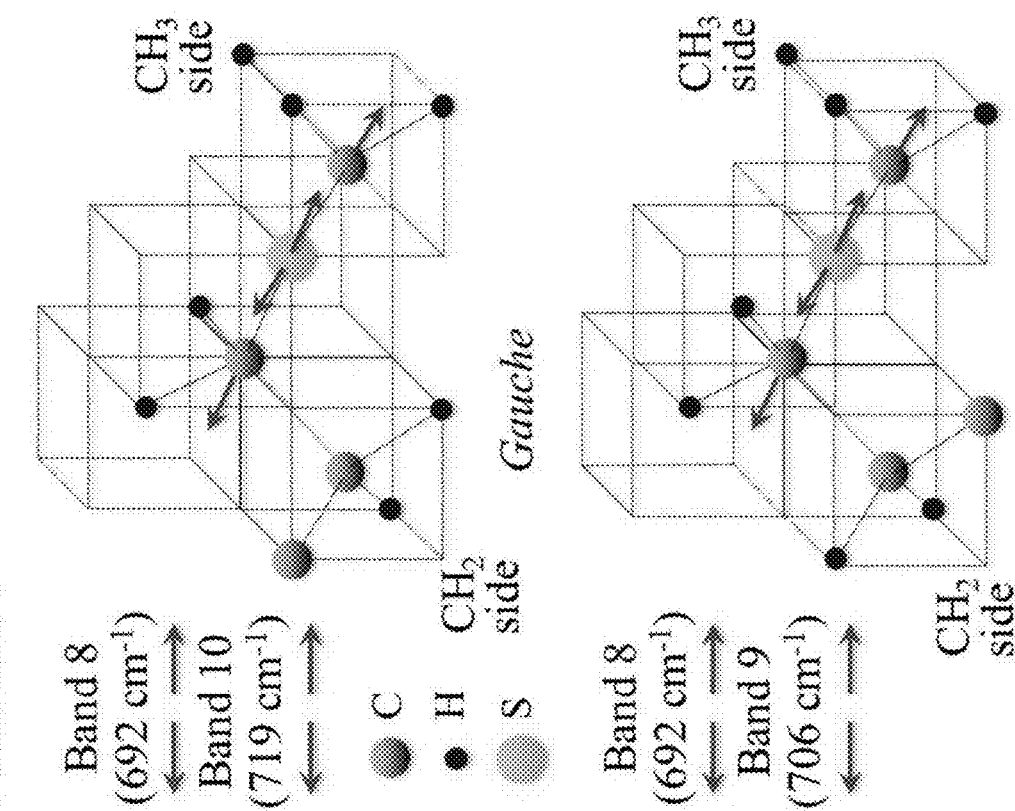
Figure 13:
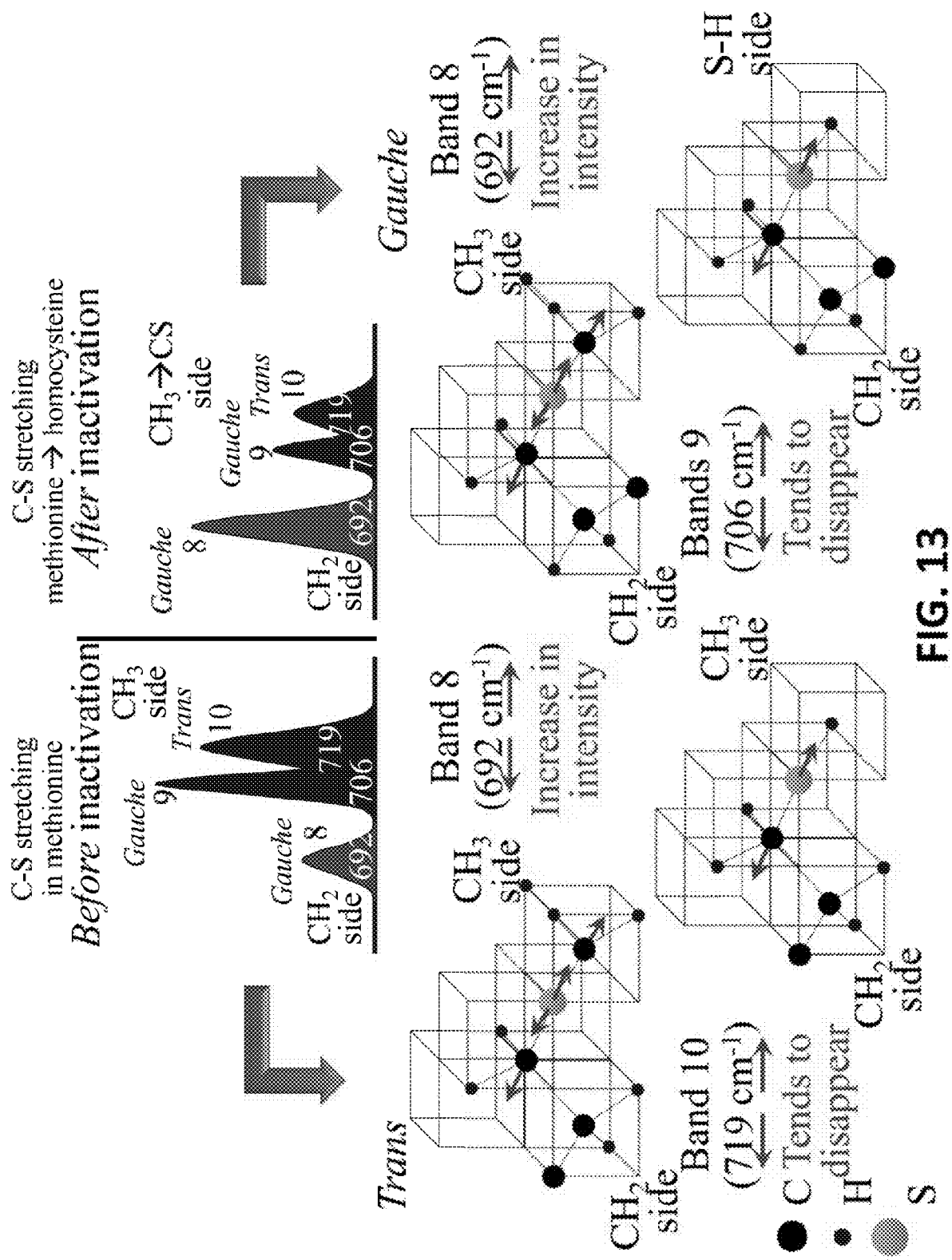
Figure 14A:
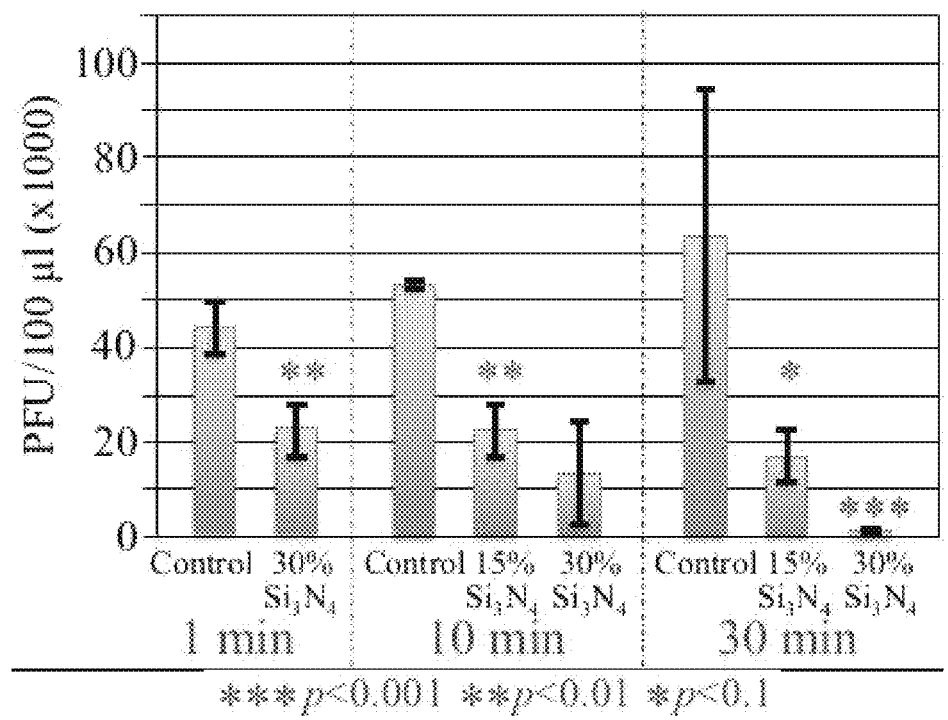
Figure 14B:
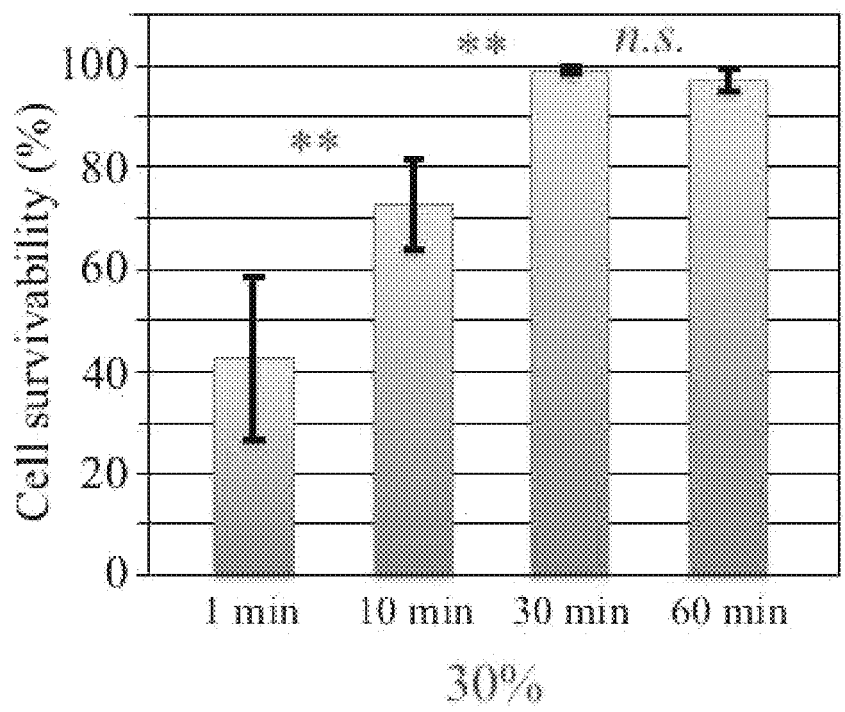

FIG. 8A is a graph of PFU/100 µl for Influenza A exposed to 15 wt. % $Si_3N_4$ for 1 minute, 5 minutes, 10 minutes, or 30 minutes at 4° C. FIG. 8B is a graph of MDCK cell survivability inoculated with Influenza A exposed to 15 wt. % $Si_3N_4$ for 1 minute, 5 minutes, 10 minutes, or 30 minutes at 4° C.

Example 3: Effect of Silicon Nitride on H1H1 Influenza a Inactivation

To show the effect of silicon nitride on the inactivation of viruses, Influenza A was exposed to a slurry of 15 wt. % silicon nitride for 10 minutes.

Figure 15A:
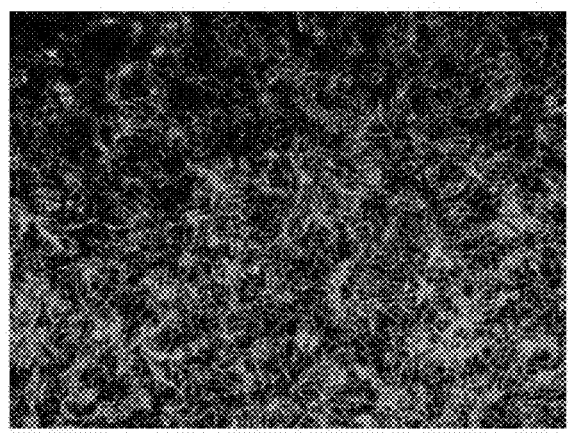
Figure 15B:
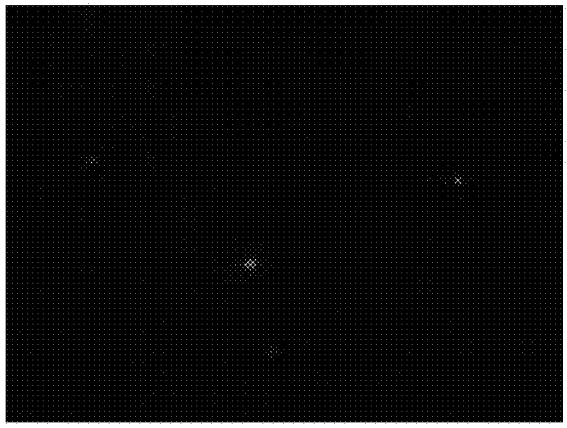
Figure 15C:
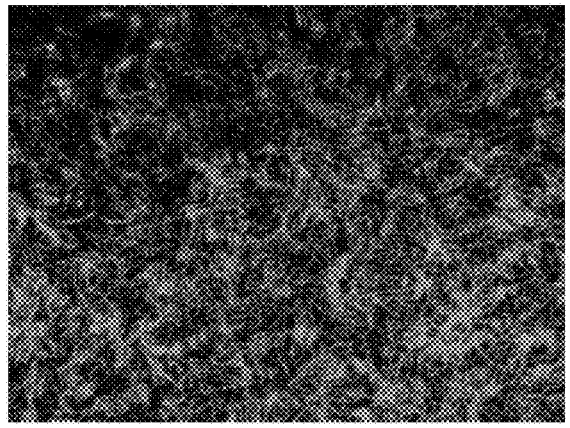
Figure 16A:
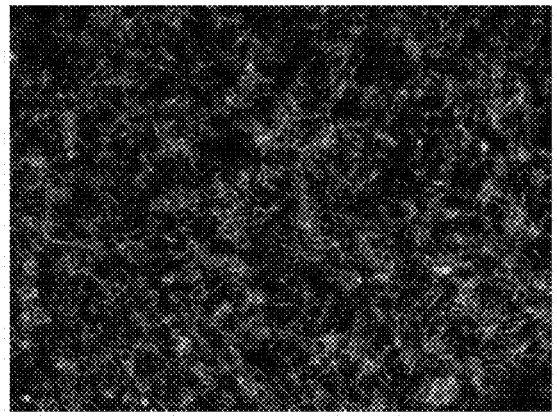
Figure 16B:
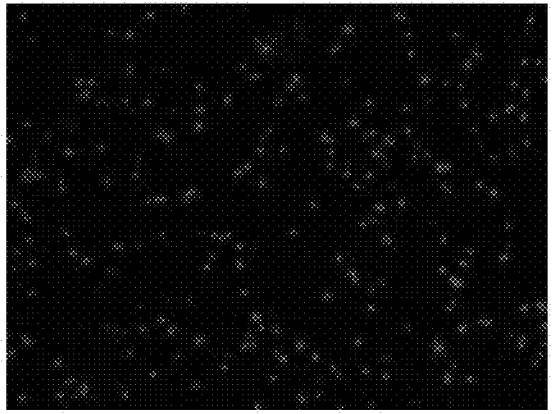
Figure 16C:
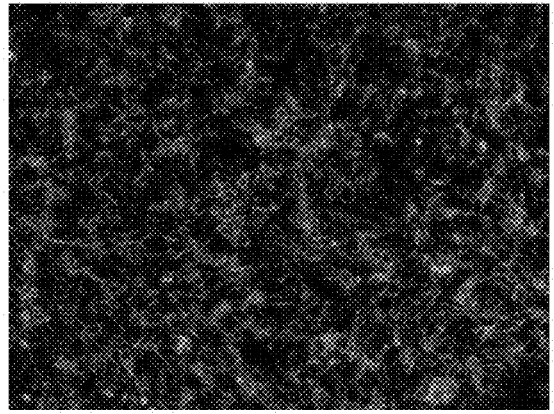
Figure 18:
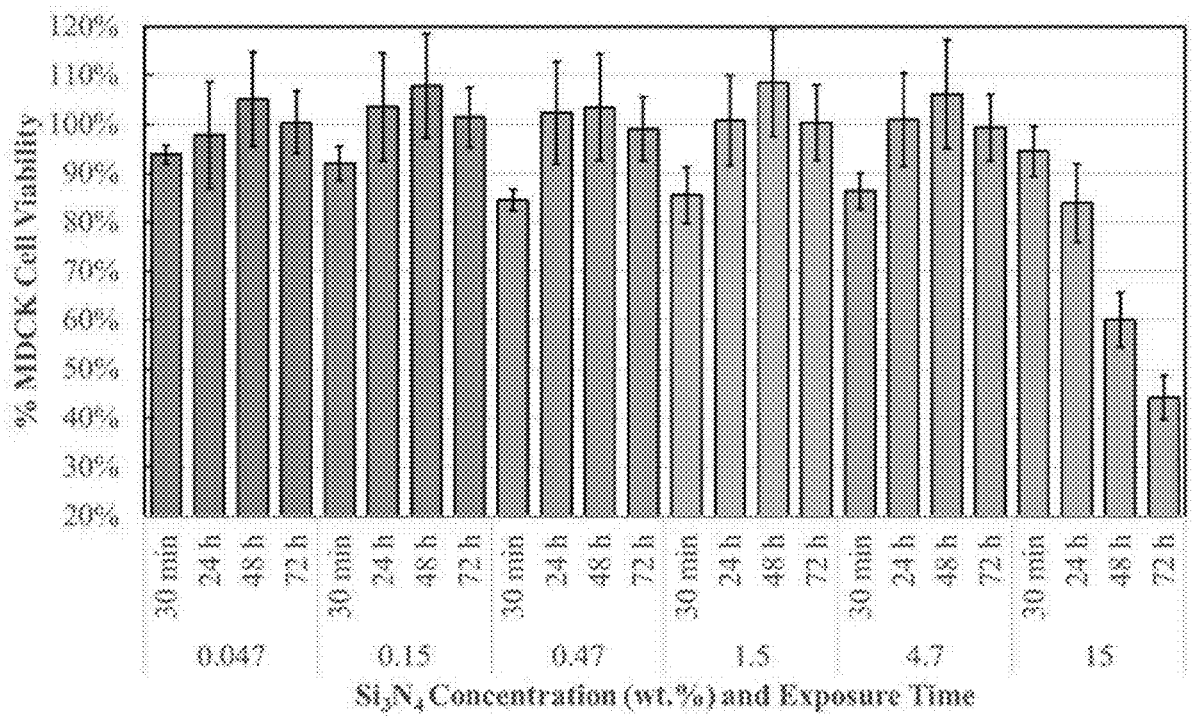
Figure 19:
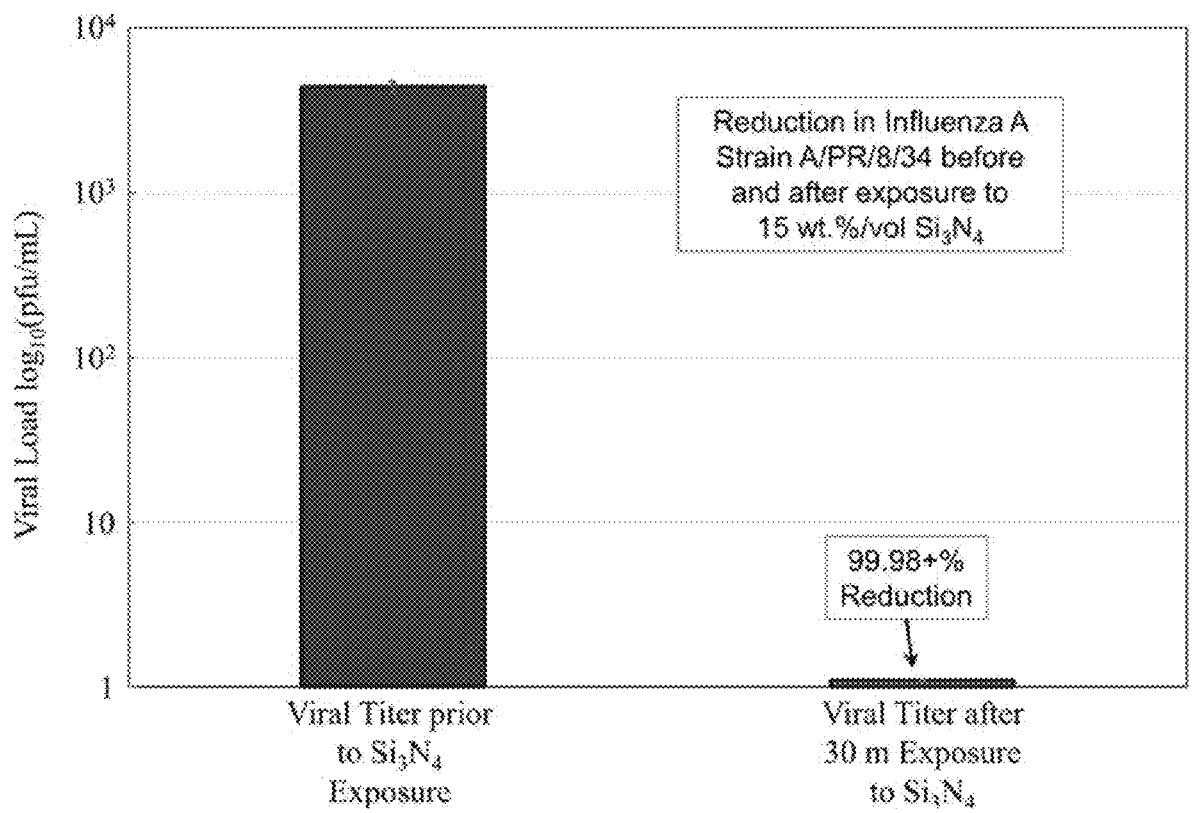

FIGS. 15A-15C show the H1H1 Influenza A virus (A/Puerto Rico/8/1934 H1N1 (PR8)) stained red (nucleoprotein, NP) after its inoculation into a biogenic medium containing MDCK cells stained green for the presence of filamentous actin (F-actin) proteins which are found in all eukaryotic cells. FIGS. 16A-16C shows the effect of the virus on the MDCK cells without the presence of silicon nitride.

Example 4: Evaluation of Influenza A Viricidal Activity by Silicon Nitride in MDCK Cells This study was designed to examine the antiviral capabilities of beta-silicon nitride (β-$Si_3N_4$) powder versus Influenza A at an incubation time-point of 30 minutes and a concentration of 15 wt. %/vol. A 15 wt. % suspension was prepared in 1.5 mL of virus diluted in DMEM with no additives.

A plaque assay methodology was utilized. To adequately quantify the plaque assay, the viability of Madin Darby Canine Kidney Cells (MDCK) were assessed as a function of exposure to various concentrations of $Si_3N_4$ for incubation periods ranging from 30 minutes to 72 hours. The results demonstrated that $Si_3N_4$ was completely viricidal to Influenza A with a reduction of >99.98% in viral load at the preselected conditions. The viability of the MDCK cells was found to be time- and dose-dependent. Essentially no loss in viability was observed for $Si_3N_4$ concentrations up to 15 wt. %/vol. Changes in viability were only noted for the 15 wt. % concentration at 24, 48, and 72 hours (i.e., 83.3%, 59.7%, and 44.0% viable, respectively).

The $Si_3N_4$ powder used in this study had a nominal composition of 90 wt. % $\alpha$-$Si_3N_4$, 6 wt. % yttria ($Y_2O_3$), and 4 wt. % alumina ($Al_2O_3$). It was prepared by aqueous mixing and spray-drying of the inorganic constituents, followed by sintering of the spray-dried granules (~1700° C. for ~3 h), hot-isostatic pressing (~1600° C., 2 h, 140 MPa in $N_2$), aqueous-based comminution, and freeze-drying. The resulting powder had a trimodal distribution with an average particle size of 0.8±1.0 μm as shown in FIG. 17. Doping $Si_3N_4$ with $Y_2O_3$ and $Al_2O_3$ is useful to densify the ceramic and convert it from its $\alpha$- to $\beta$-phase during sintering. The mechanism of densification is via dissolution of $\alpha$-phase and subsequent precipitation of $\beta$-phase grains facilitated by the formation of a transient intergranular liquid that solidifies during cooling. $\beta$-$Si_3N_4$ is therefore a composite composed of about 10 wt. % intergranular glass phase (IGP) and 90 wt. % crystalline $\beta$-$Si_3N_4$ grains.

Three sequential assays were conducted in this study: (1) An MDCK viability test; (2) An influenza A supernatant titration test with and without centrifugation and filtration; and (3) A viral titration using 15 wt. %/vol $Si_3N_4$ as the viral inhibitor for an incubation period of 30 m.

In FIG. 18, the viability of the MDCK cells is shown as function of $\beta$-$Si_3N_4$ concentration (wt. %/mL). Starting at 15 wt. %, serial dilutions were conducted to arrive at 0.047 wt. %. At the lower concentrations, cell viability was generally >80% for all timepoints up to 72 h. Note also that cell viability generally increased with exposure time for all concentrations except 15 wt. %. At 15 wt. % and 30-minutes exposure the cell viability was ~94.5%.

Following the determination of MDCK cell viability, twenty-four hours prior to the addition of the virus and sample to the cells, MDCK cells were plated in a 6-well plate at a density of $1\times10^6$ cells/well in a volume of 2 mL in Dulbecco's Minimum Essential Medium (DMEM) supplemented with 10% fetal bovine serum (FBS). On the day of the assay, triplicate samples of 15 wt. % of silicon nitride in virus diluted in DMEM with no additives at $1\times10^4$ PFU/mL was incubated for 30 minutes at room temperature with shaking. Following incubation, the samples were centrifuged for two minutes at 4° C. and 12,000 rpm, and further filtered through a 0.2-micron polyvinylidene difluoride (PVDF) filter. The samples were then serially diluted 1:5 and 7 concentrations were added to cells that had been washed 2 times with Dulbecco's Phosphate Buffered Saline (DPBS) in triplicate in a volume of 400 μL. The samples were incubated for 1 hour at 37° C. with rocking every 15 to 20 minutes. Following incubation, 2 mL of the plaque assay media was added to the wells and the cultures were incubated for 48 hours at 35° C./5% $CO_2$. After incubation, the cells were stained with crystal violet and the plaques were enumerated visually.

On the day of staining, the plaguing media was removed, and the monolayers were washed two times with DPBS. The cells were then fixed with 70% ethanol for 10 minutes at room temperature. The ethanol was removed, and 0.3% crystal violet solution was added to each well for 10 minutes at room temperature. Following this incubation, the crystal violet was removed, and the monolayers were washed two times with DPBS to remove residual crystal violet. The monolayers were air-dried overnight prior to counting the plaques.

The viricidal test was conducted at a concentration of 15 wt. %/vol and at 30 min. The process steps of centrifugation and filtration only reduced the viral load by about 0.25 $\log_{10}$. Given this result, a subsequent titration was then conducted without and with the exposure of the virus to $Si_3N_4$ for 30 minutes. The concentration for the titration without $Si_3N_4$ was a priori selected to be $4.4\times10^3$ pfu/ml based on ISO 21702 (Measurement of antiviral activity on plastics and other non-porous surfaces). After 30 minutes of exposure to $Si_3N_4$, no plaques formed on the MDCK cells. $Si_3N_4$ was deemed to be 100% effective in inactivating Influenza A. A direct comparison of the viral titers before and after exposure to the $Si_3N_4$ powder for 30 m is provided in FIG. 19. The data clearly demonstrate >3.5 $\log_{10}$ reduction in viral load after exposure to $Si_3N_4$ (i.e., >99.98%).

In summary, these tests demonstrated that exposure of $Si_3N_4$ to MDCK cells had no adverse viability effects at concentrations less than 15 wt. %/vol or time periods of ≤30 minutes. At antiviral test conditions of 15 wt. %/vol $Si_3N_4$ at 30 minutes exposure at a viral load of $4.4\times10^3$ pfu/ml, $Si_3N_4$ inactivated essentially 100% of the exposed virions. $Si_3N_4$ was found to be viricidal to Influenza A under these conditions.

Example 5: Effect of $\alpha$-$Si_3N_4$ Powder on MDCK Cells and Influenza A $\alpha$-$Si_3N_4$ powder was first evaluated for toxicity to MDCK cells following exposure for 30 minutes, 24 hours, 48 hours and 72 hours. A 15 weight % (wt. %) suspension was prepared in 1.5 mL of Dulbecco's Modified Eagle Medium (DMEM) supplemented with 2% fetal bovine serum (FBS).

Twenty-four hours prior to the addition of the sample to the cells, the $\alpha$-$Si_3N_4$ powder suspension prepared as described above was incubated for 30 minutes at room temperature with shaking. Following the incubation, the suspension was centrifuged for two minutes at 4° C. at 12,000 rpm. The supernatant was further filtered through a 0.2-micron polyvinylidene difluoride (PVDF) filter and then serially diluted in ½-logarithmic increments. Six (6) concentrations were added to the pre-plated cells in triplicate in a volume of 200 μL. The plates were incubated for 30 minutes, 24, 48, and 72 hours at which time the cells were evaluated for cellular toxicity using the tetrazolium dye XTT (2,3-bis(2-methoxy-4-nitro-5-sulfophenyl)-5-[(phenylamino)carbonyl]-2H-tetrazolium hydroxide), as described below.

TC50 values for the test materials were derived by measuring the reduction of the tetrazolium dye XTT. XTT in metabolically active cells is metabolized by the mitochondrial enzyme NADPH oxidase to a soluble formazan product. XTT solution was prepared daily as a stock of 1 mg/mL in DMEM without additives. Phenazine methosulfate (PMS) solution was prepared at 0.15 mg/mL in Dulbecco's Phosphate Buffered Saline (DPBS) and stored in the dark at −20° C. XTT/PMS stock was prepared immediately before use by adding 40 μL of PMS per mL of XTT solution. Fifty μL (50 4) of XTT/PMS was added to each well of the plate and the plate incubated for 4 hours at 37° C. The 4-hour incubation has been empirically determined to be within the linear response range for XTT dye reduction with the indicated numbers of cells for each assay. The plates were sealed and inverted several times to mix the soluble formazan product and the plate was read at 450 nm (650 nm reference wavelength) with a Molecular Devices SpectraMax Plus 384 96 well plate format spectrophotometer.

Figure 20:
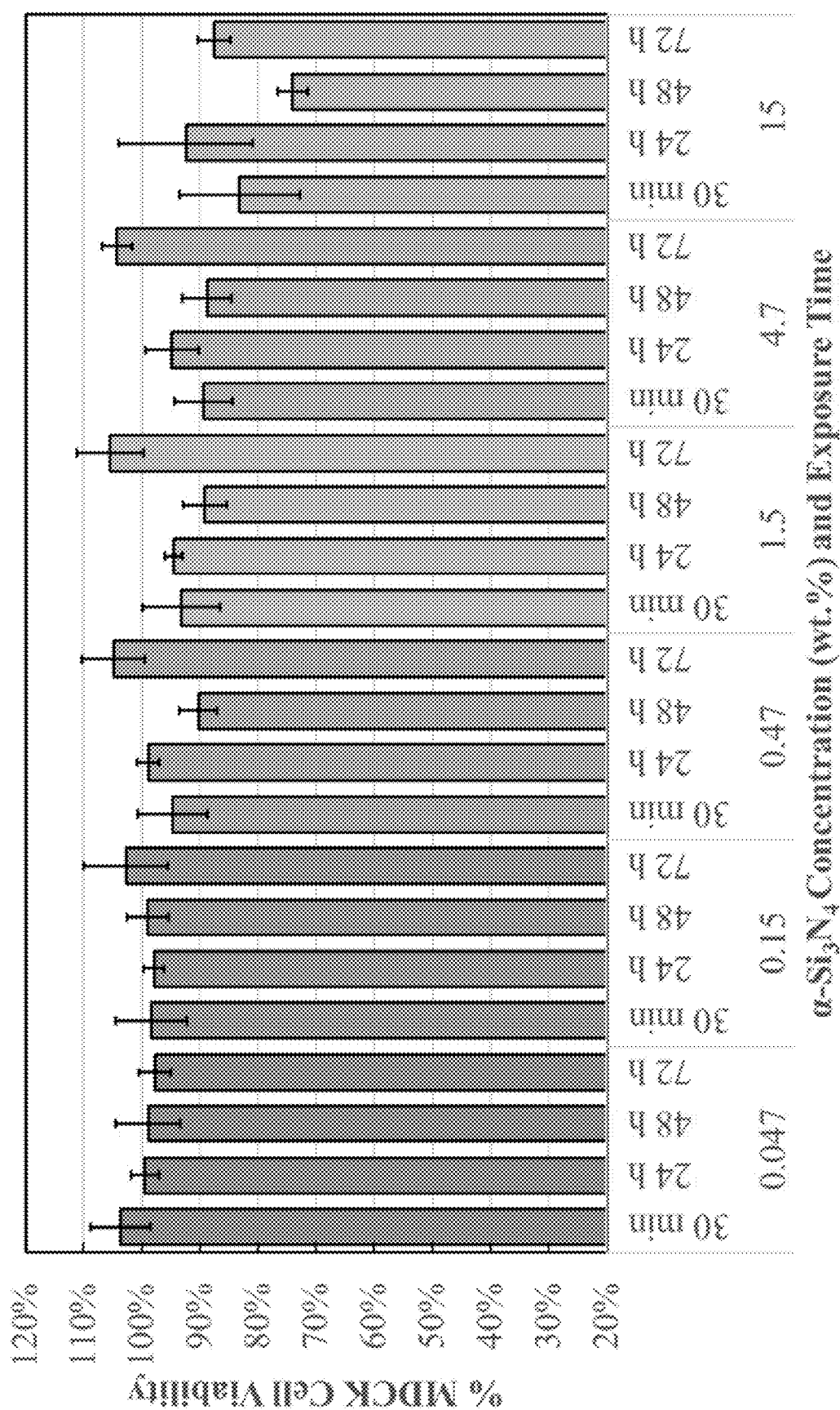

MDCK cells were treated with 6 concentrations of the α-$Si_3N_4$ powder ranging from 15 wt. % to 0.047 wt. % for 30 minutes, 24 hours, 48 hours and 72 hours. In FIG. 20, the viability of the MDCK cells is shown as function of α-$Si_3N_4$ concentration (wt. %/mL). Following 30 minutes of exposure cells treated with all concentrations had viability greater than 90% except for cells treated with 4.7 wt. % and 15 wt. % which had 89% and 83% viability, respectively. At 24 hours viability of cell treated with each concentration remained above 92%. At 48 hours viability dropped below 90% in cells treated with 1.5 wt. %, 4.7 wt. % and 15 wt. % (89.1%, 88.7% and 74.0%, respectively) but at 72 hours only cells treated with 15 wt. % had viability below 90% (87.5%).

α-$Si_3N_4$ powder at 15 wt. % was then evaluated for virucidal activity against Influenza A strain A/PR/8/34 in MDCK cells. A 15 wt. % suspension was prepared in 1.5 mL of virus diluted in DMEM with no additives.

Twenty-four hours prior to the addition of the virus and sample to the cells, MDCK cells were plated in a 6-well plate at a density of $1 \times 10^6$ cells/well in a volume of 2 mL in Dulbecco's Minimum Essential Medium (DMEM) supplemented with 10% fetal bovine serum (FBS). On the day of the assay, triplicate samples of 15 wt. % of α-$Si_3N_4$ in virus diluted in DMEM with no additives at $1 \times 10^4$ PFU/mL was incubated for 30 minutes at room temperature with shaking. Following incubation, the samples were centrifuged for two minutes at 4° C. and 12,000 rpm, and further filtered through a 0.2-micron polyvinylidene difluoride (PVDF) filter. The samples were then serially diluted 1:5 and 7 concentrations were added to cells that had been washed 2 times with Dulbecco's Phosphate Buffered Saline (DPBS) in triplicate in a volume of 400 mL. The samples were incubated for 1 hour at 37° C. with rocking every 15 to 20 minutes. Following incubation, 2 mL of the plaque assay media was added to the wells and the cultures were incubated for 48 hours at 35° C./5% $CO_2$. After incubation, the cells were stained with crystal violet and the plaques were enumerated visually.

On the day of staining, the plaguing media was removed, and the monolayers were washed two times with DPBS. The cells were then fixed with 70% ethanol for 10 minutes at room temperature. The ethanol was removed, and 0.3% crystal violet solution was added to each well for 10 minutes at room temperature. Following this incubation, the crystal violet was removed, and the monolayers were washed two times with DPBS to remove residual crystal violet. The monolayers were air-dried overnight prior to counting the plaques.

The virucidal activity of 15 wt. % α-$Si_3N_4$ powder was evaluated against Influenza virus A strain A/PR/8/34 in MDCK cells. The target virus titer was $1 \times 10^4$ PFU/mL and the actual individual replicates were $3.1 \times 10^3$, $3.8 \times 10^3$, and $4.7 \times 10^3$ PFU/mL yielding a mean titer (and standard deviation) of $3.9 \times 10^3 \pm 0.8 \times 10^3$ PFU/mL. This actual titer is within two-fold of the targeted PFU/mL. The α-$Si_3N_4$ powder treated samples had one well with a single plaque which resulted in a PFU/mL of 4.1.

The log reduction was 2.98 and was calculated using the following equation: $\log_{10}(A/B)$ where A is untreated virus and B is treated virus. The percent reduction was 99.89% and was calculated using the following equation: $(A-B) \times 100/A$ where A is untreated virus and B is treated virus. A comparison of the viral titers before and after exposure to the α-$Si_3N_4$ powder for 30 m is provided in FIG. 21. Therefore, the α-$Si_3N_4$ powder at 15 wt. % was virucidal to influenza A virus strain A/PR/8/34 following a 30-minute exposure.

Example 6: Influenza a Virucidal Activity by Two Forms of $Si_3N_4$ Powder in MDCK Cells A 5 and 10 wt. % suspension of α-$Si_3N_4$ and β-$Si_3N_4$ powder was prepared in 1.5 mL of virus diluted in DMEM with no additives.

Twenty-four hours prior to the addition of the virus and sample to the cells, MDCK cells were plated in a 6-well plate at a density of $1 \times 10^6$ cells/well in a volume of 2 mL in Dulbecco's Minimum Essential Medium (DMEM) supplemented with 10% fetal bovine serum (FBS). On the day of the assay, triplicate samples of 10 and 5 wt. % of α-$Si_3N_4$ and β-$Si_3N_4$ powders in virus diluted in DMEM with no additives at $1 \times 10^4$ PFU/mL were incubated for 30 minutes at room temperature with shaking. Following incubation, the samples were centrifuged for two minutes at 4° C. and 12,000 rpm, and further filtered through a 0.2-micron polyvinylidene difluoride (PVDF) filter. The samples were then serially diluted 1:5 and 7 concentrations were added to cells that had been washed 2 times with Dulbecco's Phosphate Buffered Saline (DPBS) in triplicate in a volume of 400 μL. The samples were incubated for 1 hour at 37° C. with rocking every 15 to 20 minutes. Following incubation, 2 mL of the plaque assay media was added to the wells and the cultures were incubated for 48 hours at 35° C./5% $CO_2$. After incubation, the cells were stained with crystal violet and the plaques were enumerated visually.

On the day of staining, the plaguing media was removed, and the monolayers were washed two times with DPBS. The cells were then fixed with 70% ethanol for 10 minutes at room temperature. The ethanol was removed, and 0.3% crystal violet solution was added to each well for 10 minutes at room temperature. Following this incubation, the crystal violet was removed, and the monolayers were washed two times with DPBS to remove residual crystal violet. The monolayers were air-dried overnight prior to counting the plaques.

The virucidal activity of 5 and 10 wt. % of α-$Si_3N_4$ and β-$Si_3N_4$ powder was evaluated against Influenza virus A strain AIPR8/34 in MDCK cells. This was performed in four individual experiments. The target virus titer was $1 \times 10^4$ PFU/mL.

In the first experiment the individual replicates for the untreated virus samples were $5.3 \times 10^3$, $5.9 \times 10^3$, and $4.1 \times 10^3$ PFU/mL yielding a mean titer (and standard deviation) of $5.1 \times 10^3 \pm 0.9 \times 10^3$ PFU/mL. Virus treated with 5 wt. % and 10 wt. % of β-$Si_3N_4$ for 10 minutes resulted in a PFU/mL of <21 for the virus treated with 10 wt. % and a PFU/mL of 21 (1 plaque formed) in virus treated with 5 wt. %. In this sample, the log reduction was 2.4 and was calculated using the following equation: log 10(NB) where A is untreated virus and B is treated virus. The percent reduction was 99.5% and was calculated using the following equation: (A−B)×100/A where A is untreated virus and B is treated virus.

In the second experiment the individual replicates for the untreated virus samples were $7.5 \times 10^3$, $7.2 \times 10^3$, and $5.0 \times 10^3$ PFU/mL yielding a mean titer (and standard deviation) of $6.6 \times 10^3 \pm 1.4 \times 10^3$ PFU/mL. Virus treated with 5 wt. % and 10 wt. % of β-$Si_3N_4$ for 5 minutes resulted in a PFU/mL of <21 for both.

In the third experiment the individual replicates were $6.9 \times 10^3$, $7.8 \times 10^3$, and $5.0 \times 10^3$ PFU/mL yielding a mean titer (and standard deviation) of $6.6 \times 10^3 \pm 1.4 \times 10^3$ PFU/mL. Virus treated with 5 wt. % and 10 wt. % of α-$Si_3N_4$ for 10 minutes resulted in a PFU/mL of <21 for both.

In the fourth experiment the individual replicates were $8.8 \times 10^3$, $1.0 \times 10^4$, and $7.5 \times 10^3$ PFU/mL yielding a mean titer (and standard deviation) of $8.8 \times 10^3 \pm 1.3 \times 10^3$ PFU/mL. Virus treated with 5 wt. % and 10 wt. % of α-$Si_3N_4$ for 5 minutes resulted in a PFU/mL of <21 for both.

In each of the experiments the actual titer determined for the untreated virus control was with-in two-fold of the targeted PFU/mL. Virus treated with both α-$Si_3N_4$ and β-$Si_3N_4$ powder at 5 and 10 wt. % for 5 and 10 minutes resulted in a PFU/mL of <1 (no plaques observed) with the exception of the β-$Si_3N_4$ powder treated sample at 5 wt. % for 10 minutes which had one well with a single plaque resulting in a PFU/mL of 21.

Example 7: Silicon Nitride Inactivation of SARS-CoV-2 In Vitro

A doped $Si_3N_4$ powder (β-SiYAlON) with a nominal composition of 90 wt. % α-$Si_3N_4$, 6 wt. % yttria ($Y_2O_3$), and 4 wt. % alumina ($Al_2O_3$) was prepared by aqueous mixing and spray-drying of the inorganic constituents, followed by sintering of the spray-dried granules (~1700° C. for ~3 h), hot-isostatic pressing (~1600° C., 2 h, 140 MPa in $N_2$), aqueous-based comminution, and freeze-drying. The resulting powder had a trimodal distribution with an average particle size of 0.8±1.0 μm as shown in FIG. 22. Doping $Si_3N_4$ with $Y_2O_3$ and $Al_2O_3$ densified the ceramic and converted it from its α- to β-phase during sintering. The mechanism of densification is via dissolution of α-phase and subsequent precipitation of β-phase grains facilitated by the formation of a transient intergranular liquid that solidifies during cooling. β-$Si_3N_4$ is therefore a composite composed of about 10 wt. % intergranular glass phase (IGP) and 90 wt. % crystalline β-$Si_3N_4$ grains.

Vero green African monkey kidney epithelial cells were chosen for this analysis due to their ability to support high levels of SARS-CoV-2 replication and their use in antiviral testing. These cells were cultured in DMEM supplemented with 10% FBS, 1% L-glutamine, and 1% penicillin/streptomycin. Cells were maintained at 37° C. and 5% $CO_2$. SARS-CoV-2 isolate USA-WA1/2020 was obtained from BEI Resources. Vero cells were inoculated with SARS-CoV-2 (MOI 0.1) to generate viral stocks. Cell-free supernatants were collected at 72 hours post-infection and clarified via centrifugation at 10,000 rpm for 10 minutes and filtered through a 0.2 μm filter. Stock virus was titered according to the plaque assay protocol detailed below.

The $Si_3N_4$ powder was suspended in 1 mL DMEM growth media in microcentrifuge tubes. Tubes were vortexed for 30 seconds to ensure adequate contact and then placed on a tube revolver for either 1, 5, or 10 minutes. At each time point, the samples were centrifuged, and the supernatant was collected and filtered through a 0.2 μm filter. Clarified supernatants were added to cells for either 24 or 48 hours. Untreated cells were maintained alongside as controls. Cells were tested at each time point using CellTiter Glo, which measures ATP production, to determine cell viability.

Figure 23:
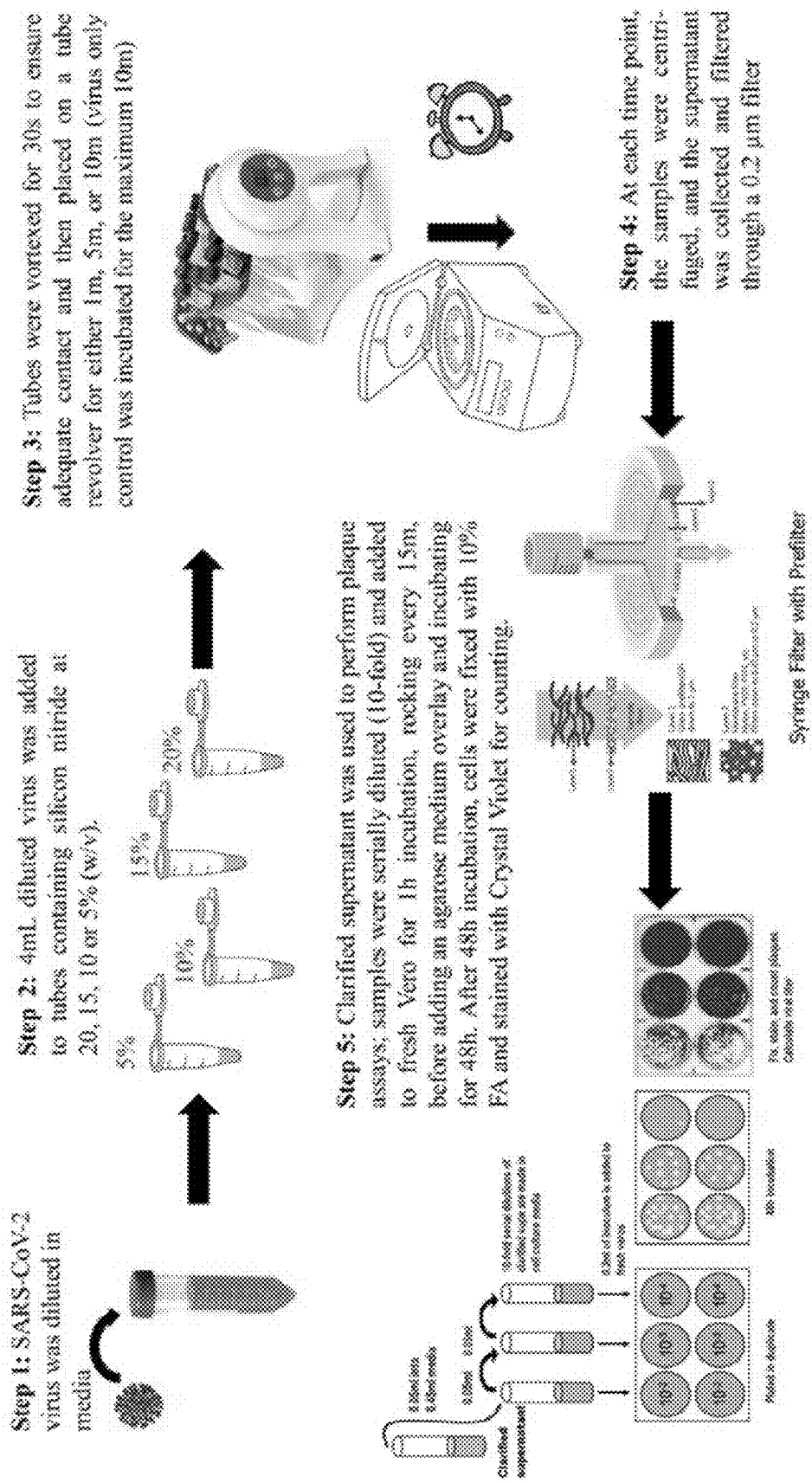

SARS-CoV-2 was diluted in DMEM growth media to a concentration of $2 \times 10^4$ PFU/mL. Four mL of the diluted virus was added to tubes containing silicon nitride at 20, 15, 10, and 5% (w/v). The virus without $Si_3N_4$ was processed in parallel as a control. Tubes were vortexed for 30 seconds to ensure adequate contact and then placed on a tube revolver for either 1, 5, or 10 minutes, while a virus only control was incubated for the maximum 10 minutes. At each time point, the samples were centrifuged, and the supernatant was collected and filtered through a 0.2 μm filter. The remaining infectious virus in the clarified supernatant was quantitated by plaque assay. An overview of the antiviral testing method is provided in FIG. 23. In step 1, SARS-CoV-2 virus was diluted in media. In step 2, 4 mL of diluted virus was added to tubes containing silicon nitride at 20, 15, 10, or 5% (w/v). In step 3, tubes were vortexed for 30 s to ensure adequate contact and the placed on a tube revolver for either 1 m, 5 m, or 10 m (virus only control was incubated for the maximum 10 m). In step 4, at each time point, the samples were centrifuged, and the supernatant was collected and filtered through a 0.2 μm filter. In step 5, clarified supernatant was used to perform plaque assays. Samples were serially diluted (10-fold) and added to fresh Vero for 1 h incubation, ricking every 15 min before adding an agarose medium overlay and incubating for 48 h. After 48 h incubation, cells were fixed with 10% FA and stained with Crystal Violet for counting.

Vero cells were plated at $2 \times 10^5$ cells/well in a 12-well plate on the day before the plaque assay. Clarified supernatants from the antiviral testing were serially diluted (10-fold) and 200 μL was added to Vero cells which were incubated for 1 hour at 37° C., 5% $CO_2$. Plates were rocked every 15 minutes to ensure adequate coverage and at 1 hour, a 1:1 ratio of 0.6% agarose and 2×EMEM supplemented with 5% FBS, 2% penicillin/streptomycin, 1% non-essential amino acids (VWR, Cat #45000-700), 1% sodium pyruvate, and 1% L-glutamine was added to the cells before incubating for 48 hours at 37° C., 5% $CO_2$. After incubation, the cells were fixed with 10% formaldehyde and stained with 2% crystal violet in 20% ethanol for counting.

Figure 24A:
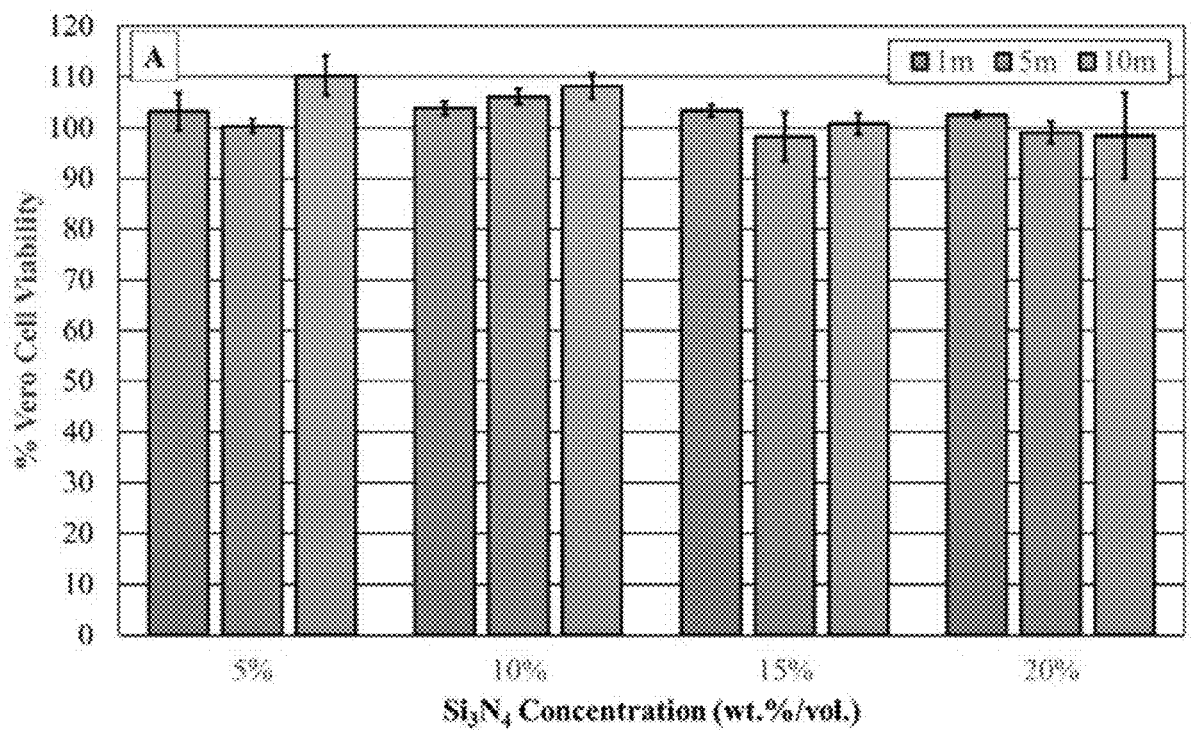
Figure 24B:
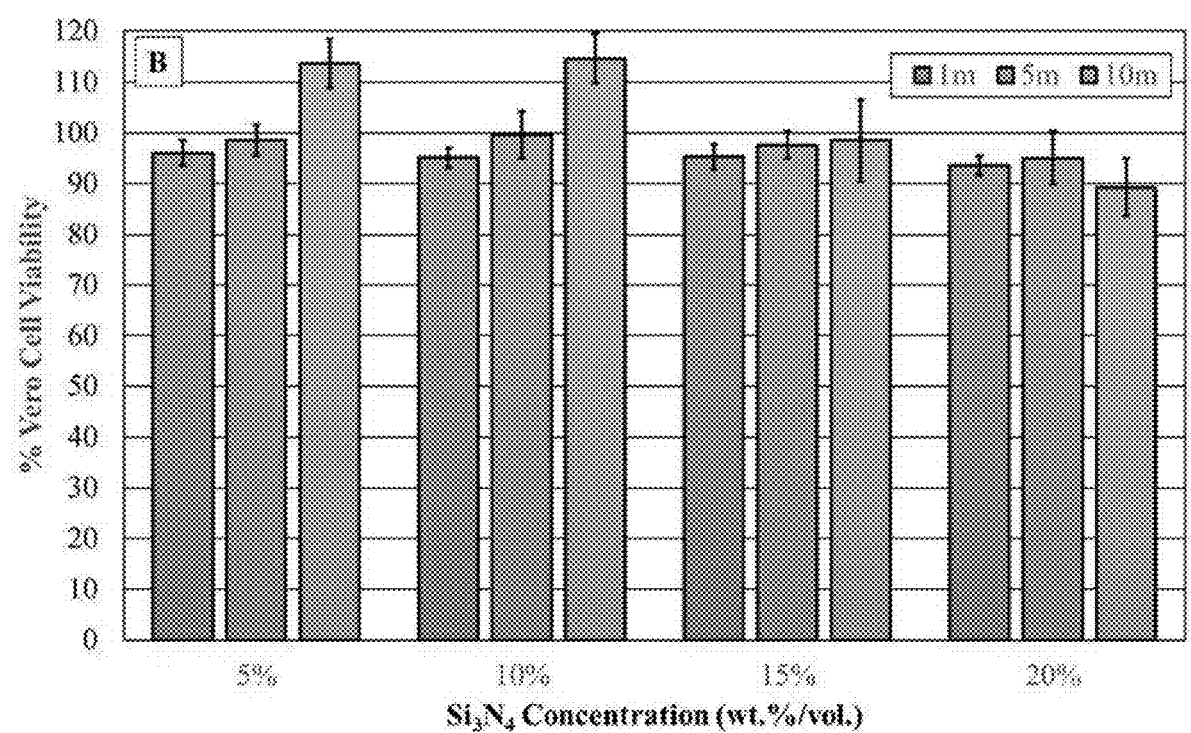

The impact of $Si_3N_4$ on eukaryotic cell viability was tested. $Si_3N_4$ was resuspended in cell culture media at 5, 10, 15, and 20% (w/v). Samples were collected at 1, 5, and 10 minutes and added to Vero cells. Vero cell viability was measured at 24 and 48 hours post-exposure (FIGS. 24A and 24B). No significant decrease in cell viability was observed at either 24 or 48 hours post-exposure with 5%, 10%, or 15% silicon nitride. A small impact on cell viability (~10% decrease) was observed at 48 hours in cells exposed to 20% $Si_3N_4$. Interestingly, a ~10% increase in Vero cell viability was observed at 48 hours with the 5%-10 minute and 10%-10 minute samples (FIG. 24B), suggesting that $Si_3N_4$ may be stimulating cell growth or cellular metabolism under these conditions. These data indicated that $Si_3N_4$ has minimal impact on Vero cell health and viability up to 20 wt. %/vol.

Figure 25A:
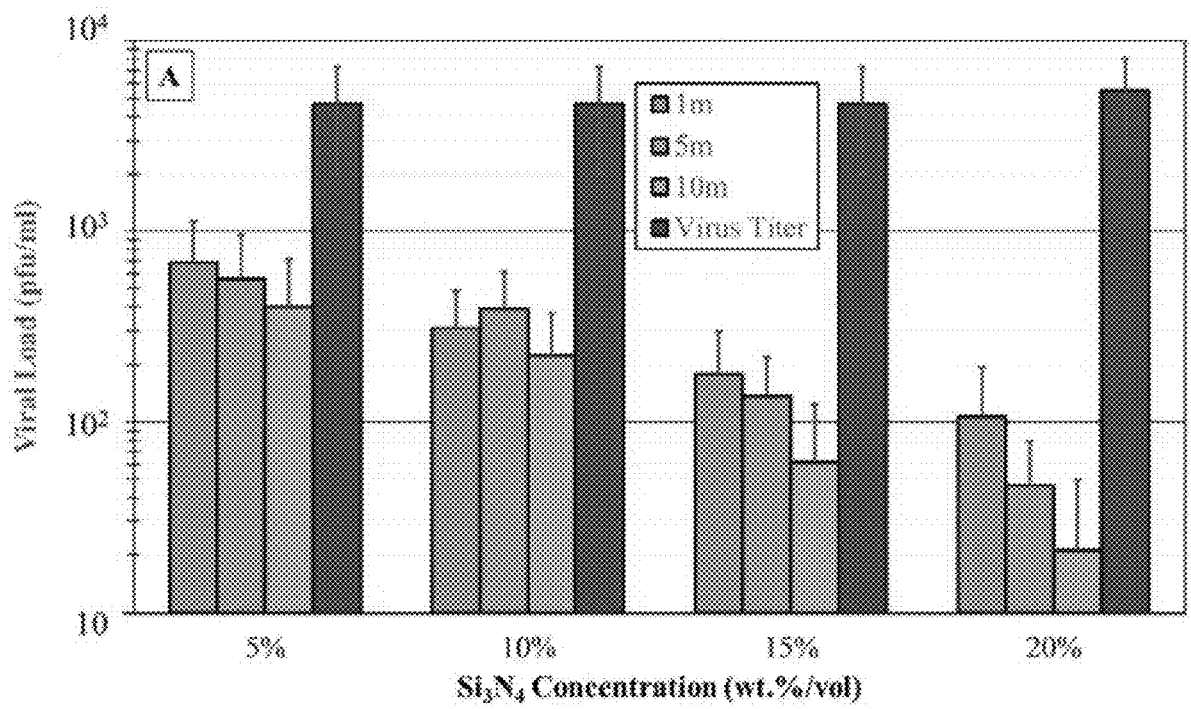
Figure 25B:
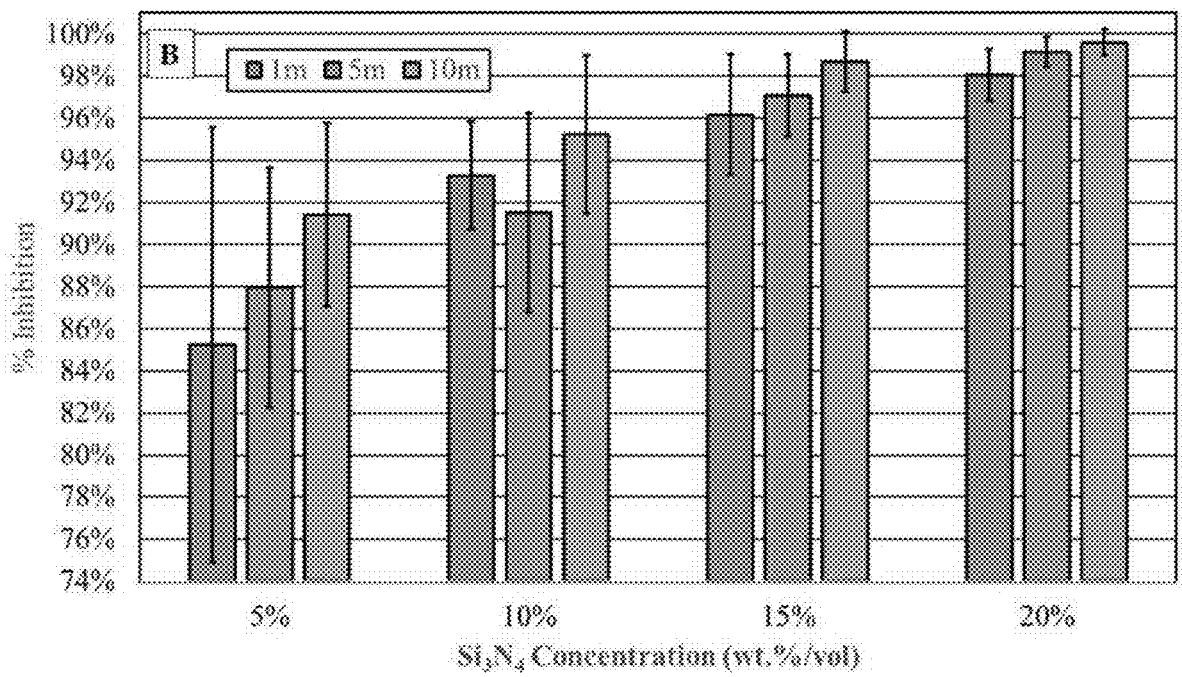

Given that 5, 10, 15, and 20% $Si_3N_4$ were non-toxic to Vero cells, antiviral testing at these concentrations was performed. SARS-CoV-2 virions were exposed to $Si_3N_4$ at these concentrations for 1, 5, or 10 minutes. Following $Si_3N_4$ exposure, the infectious virus remaining in each solution was determined through plaque assay. At each timepoint, the samples were centrifuged, and the supernatant was collected and filtered through a 0.2 um filter. The clarified supernatant was used to perform plaque assay in duplicate. Virus processed in parallel but only exposed to cell culture media contained $4.2 \times 10^3$ PFU/mL. SARS-CoV-2 titers were reduced when exposed to all concentrations of $Si_3N_4$ tested (FIGS. 25A and 25B). The inhibition was dose-dependent with SARS-CoV-2 exposed for 1 minute and 5% $Si_3N_4$ having reduced viral titers by ~0.8 $log_{10}$, 10% $Si_3N_4$ by ~1.2 $log_{10}$, 15% $Si_3N_4$ by 1.4 $log_{10}$, and 20% $Si_3N_4$ by 1.7 $log_{10}$ (FIG. 25A). Similar results were observed with the 5 and 10 minute samples. This reduction in viral titers corresponded to 85% viral inhibition at 5% $Si_3N_4$, 93% at 10% $Si_3N_4$, 96% at 15% $Si_3N_4$, and 98% viral inhibition at 20% $Si_3N_4$ (FIG. 25B). Higher $Si_3N_4$ concentrations for longer times resulted in increased inhibition—leading to 99.6% viral inhibition at 20% $Si_3N_4$ and 10 minute exposure (FIG. 25B). These data indicate that $Si_3N_4$ has a strong antiviral effect against SARS-CoV-2.

The surprising finding was that a one-minute exposure to a 5% solution of $Si_3N_4$ resulted in 85% inactivation of SARS-CoV-2, while Vero cell viability was minimally impacted even after a 48 hour exposure to a 20% concentration of the same material.

Example 8: Embedding Silicon Nitride in Fabric

Pretreatment

Two sequential steps were performed for pretreatment. In the first step, a segment of the scrim was precleaned by agitating it in a heated covered tank containing deionized water (90° C.≤T≤100° C.) for 10 minutes. After cleaning, the scrim was air dried. This step tends to remove organic chemicals used in manufacturing the fabric along with loosely adherent contamination due to transportation and storage. Use of a detergent was avoided to prevent interference with the coupling agent. In the second step, the fabric was submerged into a room-temperature water-bath under agitation. Due to its hydrophobic nature, the scrim has to be held under water. This was done by placing the fabric in a covered 304 stainless steel basket. An organic surfactant (i.e., coupling agent) was added to the bath. The surfactant used was n-dodecyl trimethyl ammonium bromide (DTAB). The amount of DTAB that was added is based on the weight of the scrim to be treated using the following calculation: Weight of DTAB (g)=Weight of Scrim (g)×1.73. After adding the DTAB, the bath temperature was increased to 100° C. (boiling) and held at this temperature for 30 minutes. The scrim was then removed from the bath and laid flat in a circulating air oven at 110° C. for 10 minutes to dry.

Embedding Process

The embedding process employed three process steps. The first step involved preparation of a dispersion of the $Si_3N_4$ powder in deionized water. This was accomplished by weighing and discharging the water, an organic dispersant, and the $Si_3N_4$ into a vibratory or ball mill and agitating the constituents for a minimum of 30 minutes. The dispersion may also be effected using a high-intensity shear mixer (i.e., propeller action) for about the same length of time. The composition of the dispersion was as follows (based on ~1 liter batch size): 210.0 g $Si_3N_4$ powder, 2.1 g Dolapix A88 Dispersant, and 790.0 g Deionized Water.

The second step involved siphoning the $Si_3N_4$ dispersion (i.e., slurry) into a handheld HTE compliant spray gun and manually applying it evenly to one side of the pretreated fabric at a pressure of about 30 psi (2.1 bar, 210 kPa) and an application rate of about 0.45 ml/cm² at a distance of about 0.5 meter. After air drying for about 10 minutes, the opposite side of the scrim was then coated in the same manner. The spraying process was then repeated a second time (i.e., two applications per side). The third step involved submerging the coated scrim into the residual $Si_3N_4$ slurry within a Branson laboratory ultrasonic bath for 10 minutes at a temperature of 65° C.≤T≤75° C. and a power setting of about 60 W and 20 kHz. Afterwards, the fabric was put through a wringer to remove excess slurry and placed flat in a drying oven at ~110° C. for about 10 minutes.

Thermal Bonding

Bonding of the $Si_3N_4$ particles to the scrim was accomplished by laying single sheets of the fabric between two precision heavy stainless steel plates within an oven at a temperature of 145° C. for 90 minutes. The process created about 0.1 psi (~0.7 kPa) of pressure on the fabric. This pressure was critically important to force embedding of the $Si_3N_4$ particles into the polypropylene fibers. The plates containing the fabric were then removed from the oven and allowed to cool to room temperature.

Washing and Rinsing

Rinsing was an important step. It removed non-bonded $Si_3N_4$ particles from the fabric. This was accomplished in a two-step operation. The first step involved washing the embedded scrim in deionized water using a non-ionic surfactant within a Branson laboratory ultrasonic bath operating at a power setting of about 60 W and 20 kHz. The composition of this wash step was as follows (based on a 1 liter batch size): 10.0 g Triton X-100 Surfactant and 990.0 g Deionized Water.

After the wash bath was prepared, the fabric was submerged and sonicated at 60° C.≤T≤70° C. for five minutes. The scrim was then pulled through a wringer to remove excess liquid. The second step involved rinsing the scrim in clean deionized water. This was also accomplished in the ultrasonic bath at 60° C.≤T≤70° C. at a power setting of about 60 W and 20 kHz for five minutes. Repetitive rinse cycles were often conducted until the rinse water was clear.

Drying

The cleaned and rinsed fabric was dried by simply laying it flat on a drying oven rack for approximately 10 minutes at about 110° C.

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of embedding silicon nitride powder in a fibrous material, the method comprising:
   pre-treating the fibrous material in at least one pre-treatment tank; and
   embedding silicon nitride particles in the fibrous material, wherein the at least one pre-treatment tank comprises an array of ultrasonic transducers, wherein a first pre-treatment tank contains hot deionized water having a temperature of about 90° C. to about 100° C. at a first pre-treatment step, wherein a second pre-treatment tank contains a water-bath with a coupling agent at a second pre-treatment step, wherein the fibrous material is selected from the group consisting of polypropylene, polyester, rayon, nylon, and acrylic fiber, wherein the coupling agent is an organic surfactant selected from the group consisting of bromides, hydroxides, fluorides, and chlorides, and wherein the coupling agent is in the water at a weight ratio of about 1:200 to about 1:1000.

2. The method of claim 1, wherein the first pre-treatment tank comprises a roller.

3. The method of claim 2, wherein the first pre-treatment tank is configured to allow the fibrous material to continuously move under tension of the roller through the water in the first pre-treatment tank at a distance of between about 8 and 10 cm above a bottom of the first pre-treatment tank.

4. The method of claim 1, wherein the hot deionized water has a temperature of 95° C. to 100° C.

5. The method of claim 1, wherein a residence time of the fibrous material in the hot water is about 5 minutes to 20 minutes.

6. The method of claim 1, wherein the first pre-treatment tank operates under a continuous circulation and filtration system to remove contaminants from the water.

7. The method of claim 1, further comprising squeezing excess water from the fibrous material using a pressure wringer upon exiting the first pre-treatment tank.

8. The method of claim 1, wherein the array of ultrasonic transducers are located on an exterior bottom of the at least one pre-treatment tank.

9. The method of claim 1, wherein the array of ultrasonic transducers operate at up to 25 kHz ultrasonic energy and up to 2000 W of thermal energy.

10. The method of claim 1, wherein the coupling agent facilitates bonding of the silicon nitride particles to the fibrous material.

11. The method of claim 1, wherein the coupling agent is n-dodecyl trimethyl ammonium bromide (DTAB).

12. The method of claim 1, wherein the coupling agent is dioctadecyl dimethyl ammonium bromide (DODA).

13. The method of claim 1, further comprising replenishing the coupling agent in the second pre-treatment tank.

14. The method of claim 13, wherein the replenishing is performed via a metered addition system coupled with mechanical stirring within the second pre-treatment tank.

15. The method of claim 13, wherein the replenishing is performed as a separate larger mixing tank that is plumbed to the second pre-treatment tank using a recirculation pumping system.

16. The method of claim 1, further comprising squeezing excess water from the fibrous material using a pressure wringer upon exiting the second pre-treatment tank.

17. The method of claim 16, further comprising removing residual moisture from the fibrous material via a heated air blower operating at about 100° C.

* * * * *